US012706053B2

(12) United States Patent
Chae et al.

(10) Patent No.: US 12,706,053 B2
(45) Date of Patent: Aug. 11, 2026

(54) DISPLAY APPARATUS

(71) Applicant: Samsung Display Co., Ltd., Yongin-si (KR)

(72) Inventors: Soojung Chae, Yongin-si (KR); Sungjoon Kwak, Yongin-si (KR); Jaehong Kim, Yongin-si (KR); Seokhwan Bang, Yongin-si (KR); Jaehyoung Youn, Yongin-si (KR); Jemin Lee, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 19/016,701

(22) Filed: Jan. 10, 2025

(65) Prior Publication Data

US 2025/0252931 A1 Aug. 7, 2025

(30) Foreign Application Priority Data

Feb. 6, 2024 (KR) ........................ 10-2024-0018411

(51) Int. Cl.
*G09G 3/3266* (2016.01)

(52) U.S. Cl.
CPC ... *G09G 3/3266* (2013.01); *G09G 2310/0286* (2013.01); *G09G 2320/0247* (2013.01); *G09G 2330/021* (2013.01)

(58) Field of Classification Search
CPC .. H10D 86/60; H10D 86/423; H10D 30/6755; H10D 86/441; H10D 30/6757; H10D 30/6756; H10D 30/67; H10D 86/021; H10D 30/6745; H10D 30/6734; H10D 86/471; H10D 30/6704; G02F 1/1368; H10K 59/1213; H10K 59/131; H10K 59/1201; H10K 59/12; H10K 50/00; G09G 3/3233; G09G 2300/0426; G09G 3/3648; G09G 3/32
See application file for complete search history.

(56) References Cited

U.S. PATENT DOCUMENTS

| | | | |
|---|---|---|---|
| 8,395,157 | B2 | 3/2013 | Park et al. |
| 2022/0165824 | A1 | 5/2022 | Kim |

(Continued)

FOREIGN PATENT DOCUMENTS

| | | |
|---|---|---|
| KR | 10-1108176 | 1/2012 |
| KR | 10-2022-0072930 | 6/2022 |

(Continued)

*Primary Examiner* — Sujit Shah
(74) *Attorney, Agent, or Firm* — Harness, Dickey & Pierce, P.L.C.

(57) ABSTRACT

A display apparatus includes display elements disposed in a display area, a first bottom metal layer disposed on a substrate, a second bottom metal layer disposed on the first bottom metal layer, and a thin-film transistor disposed on the second bottom metal layer, the thin film transistor including a semiconductor layer and a gate electrode, the semiconductor layer including a channel region, and the gate electrode overlapping the semiconductor layer, the channel region includes a first region and a second region, the first region overlapping one of the first bottom metal layer and the second bottom metal layer in a plan view, and the second region overlapping the other of the first bottom metal layer and the second bottom metal layer in the plan view.

20 Claims, 12 Drawing Sheets

(56) References Cited

U.S. PATENT DOCUMENTS

| | | | | |
|---|---|---|---|---|
| 2022/0190170 | A1 | 6/2022 | Lee et al. | |
| 2022/0208932 | A1 | 6/2022 | Yun | |
| 2022/0209019 | A1 | 6/2022 | Baeck et al. | |
| 2022/0392984 | A1 * | 12/2022 | Kim | H10H 29/32 |
| 2023/0187559 | A1 * | 6/2023 | Chen | H10D 64/01<br>257/66 |
| 2023/0215877 | A1 * | 7/2023 | Hara | H10D 86/60<br>257/59 |

FOREIGN PATENT DOCUMENTS

| | | |
|---|---|---|
| KR | 10-2022-0084837 | 6/2022 |
| KR | 10-2022-0095117 | 7/2022 |
| KR | 10-2022-0097678 | 7/2022 |

* cited by examiner

DISPLAY APPARATUS

CROSS-REFERENCE TO RELATED APPLICATION(S)

This application claims priority to and benefits of Korean Patent Application No. 10-2024-0018411 under 35 U.S.C. § 119, filed on Feb. 6, 2024, in the Korean Intellectual Property Office, the entire contents of which are incorporated herein by reference.

BACKGROUND

1. Technical Field

One or more embodiments relate to a display apparatus, and, to a display apparatus with improved reliability and configured to display high-quality images.

2. Description of the Related Art

Generally, a display apparatus such as an organic light-emitting display apparatus, thin-film transistors, connection electrodes, and wirings are disposed in each (sub) pixel to control the brightness and the like of each (sub) pixel disposed in a display area. A scan driver is disposed in a peripheral area outside of the display area, and scan signals from the scan driver are transferred to (sub) pixels through scan lines.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

One or more embodiments include a display apparatus with improved reliability and configured to display high-quality images. However, such a technical problem is just an example, and the disclosure is not limited thereto.

Additional aspects will be set forth in part in the description which follows and, in part, will be apparent from the description, or may be learned by practice of the embodiments.

According to one or more embodiments, a display apparatus may include display elements disposed in a display area; a first bottom metal layer disposed on a substrate; a second bottom metal layer disposed on the first bottom metal layer, and a thin-film transistor disposed on the second bottom metal layer, the thin film transistor including a semiconductor layer and a gate electrode, the semiconductor layer including a channel region, and the gate electrode overlapping the semiconductor layer, wherein the channel region may include a first region and a second region, the first region overlapping one of the first bottom metal layer and the second bottom metal layer in a plan view, and the second region overlapping the other of the first bottom metal layer and the second bottom metal layer in the plan view.

The first bottom metal layer may be electrically connected to the second bottom metal layer.

The display apparatus may further include a gate connection electrode, the gate connection electrode and the gate electrode disposed on a same layer, wherein the gate connection electrode may be electrically connected to the first bottom metal layer and the second bottom metal layer through a contact hole.

The gate electrode, the first bottom metal layer, and the second bottom metal layer may receive a same signal.

The channel region may include a third region overlapping the first bottom metal layer and the second bottom metal layer.

The display apparatus may further include a scan driver disposed in a peripheral area and including the thin-film transistor.

The scan driver may include a plurality of stages and an output terminal corresponding electrically to a scan line corresponding to each of the plurality of stages.

The display apparatus may further include a pixel circuit disposed in a peripheral area, including the thin-film transistor, and electrically connected to the display element.

The gate electrode may include branches extending in a first direction and electrically connected, the first bottom metal layer may include first branch metals extending in the first direction and electrically connected, and the second bottom metal layer may include second branch metals extending in the first direction and electrically connected.

A distance between the first bottom metal layer and the channel region may be greater than a distance between the second bottom metal layer and the channel region in a cross sectional view.

The display apparatus may further include a first buffer layer disposed between the first bottom metal layer and the second bottom metal layer, and a second buffer layer disposed between the second bottom metal layer and the semiconductor layer, wherein each of the first buffer layer and the second buffer layer may include at least one of silicon oxide, silicon nitride, and silicon oxynitride.

According to one or more embodiments, a display apparatus may include a display element electrically connected to a pixel circuit; and a scan driver disposed in a peripheral area, wherein the scan driver may include a first bottom metal layer disposed on a substrate; a second bottom metal layer electrically connected to the first bottom metal layer, and a thin-film transistor disposed on the second bottom metal layer, the thin-film transistor including a semiconductor layer and a gate electrode, wherein the semiconductor layer may include a channel region, and the gate electrode overlaps the semiconductor layer, wherein the channel region may include a first region and a second region; the first region overlapping one of the first bottom metal layer and the second bottom metal layer in a plan view, and the second region overlapping the other of the first bottom metal layer and the second bottom metal layer in the plan view.

The channel region may include a third region overlapping the first bottom metal layer and the second bottom metal layer in a plan view.

The gate electrode may be electrically connected to the first bottom metal layer and the second bottom metal layer.

The gate electrode may include branch electrodes extending in a first direction and electrically connected, the first bottom metal layer may include first branch metals extending in the first direction and electrically connected, and the second bottom metal layer may include second branch metals extending in the first direction and electrically connected.

The branch electrodes may include a first branch electrode and a second branch electrode each disposed in a second direction perpendicular to the first direction, the first branch metals may include a first-1 branch metal overlapping at least a portion of the first branch electrode, and a first-2 branch metal overlapping at least a portion of the second branch electrode, and the second branch metals may include a second-1 branch metal overlapping at least a portion of the first branch electrode, and a second-2 branch metal overlapping at least a portion of the second branch electrode.

A width in the second direction between the first-1 branch metal and the second-2 branch metal may be greater than a width in the second direction between the first-1 branch metal and the second branch electrode.

A distance between the first bottom metal layer and the channel region may be greater than a distance between the second bottom metal layer and the channel region in a cross-sectional view.

The display apparatus may further include a first buffer layer disposed between the first bottom metal layer and the second bottom metal layer, and a second buffer layer disposed between the second bottom metal layer and the semiconductor layer, wherein each of the first buffer layer and the second buffer layer may include at least one of silicon oxide, silicon nitride, and silicon oxynitride.

The display apparatus may further include a gate connection electrode integral with the gate electrode, wherein the gate connection electrode may be electrically connected to the first bottom metal layer and the second bottom metal layer through a contact hole.

These and/or other aspects will become apparent and more readily appreciated from the following description of the embodiments, the accompanying drawings, and claims.

BRIEF DESCRIPTION OF THE DRAWINGS

The above and other aspects, features, and advantages of embodiments will be more apparent from the following description taken in conjunction with the accompanying drawings, in which.

DETAILED DESCRIPTION OF THE EMBODIMENTS

Figure 1:
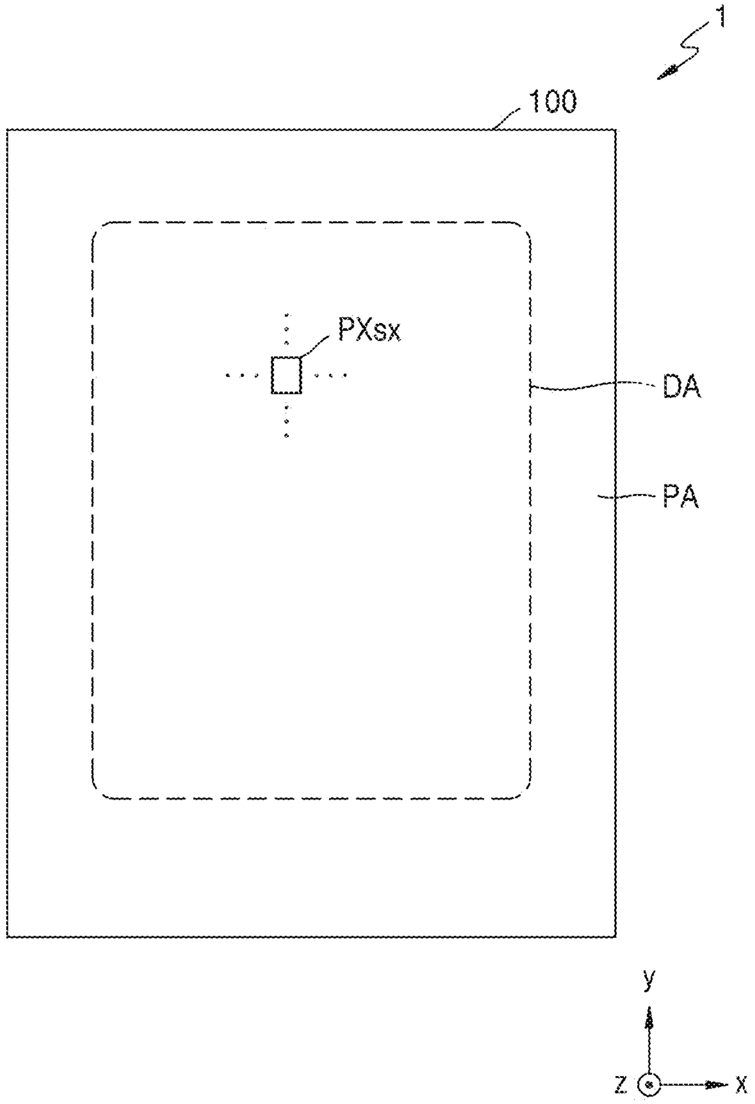
FIG. 1 is a schematic plan view of a display apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are described below, by referring to the figures, to explain aspects of the description.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Throughout the disclosure, the expression "at least one of a, b or c" indicates only a, only b, only c, both a and b, both a and c, both b and c, all of a, b, and c, or variations thereof.

As the disclosure allows for various changes and numerous embodiments, embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, wherein like reference numerals refer to like elements throughout and a repeated description thereof is omitted.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or elements but do not preclude the addition of one or more other features or elements.

It will be further understood that, when a layer, region, or element is referred to as being "on" another layer, region, or element it can be directly or indirectly on the other layer, region, or element. For example, intervening layers, regions, or elements may be present.

Sizes of elements in the drawings may be exaggerated or reduced for convenience of explanation. As an example, the size and thickness of each element shown in the drawings are arbitrarily represented for convenience of description, and thus, the disclosure is not necessarily limited thereto.

In the case where an embodiment may be implemented differently, a specific process order may be performed in the order different from the described order. As an example, two processes successively described may be simultaneously performed substantially and performed in the opposite order.

In the specification, "A and/or B" means A or B, or A and B. In the specification, "at least one of A and B" means A or B, or A and B.

It will be understood that when a layer, region, or element is referred to as being "connected" to another layer, region, or element, it may be "directly connected" to the other layer, region, or element or may be "indirectly connected" to the other layer, region, or element with another layer, region, or element located therebetween. For example, it will be understood that when a layer, region, or element is referred to as being "electrically connected" to another layer, region, or element, it may be "directly electrically connected" to the other layer, region, or element or may be "indirectly electrically connected" to the other layer, region, or element with another layer, region, or element disposed between.

As used herein, when a wiring is referred to as "extending in a first direction or a second direction", it means that the wiring not only extends in a straight line shape but also extends in a zigzag or in a curve in the first direction or the second direction.

As used herein, "on a plan view" means that an objective portion is viewed from above, and "on a cross-sectional view" means that a cross-section of an objective portion taken vertically is viewed from a lateral side. As used herein, when it is referred that a first element "overlaps" a second element, the first element is arranged above or below the second element.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different orientations that are not perpendicular to one another.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

When an element is described as 'not overlapping' or 'to not overlap' another element, this may include that the elements are spaced apart from each other, offset from each other, or set aside from each other or any other suitable term as would be appreciated and understood by those of ordinary skill in the art.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic plan view of a display apparatus 1 according to an embodiment.

Referring to FIG. 1, the display apparatus 1 may include a display area DA configured to display images and a peripheral area PA arranged (or disposed) around the display area DA. The display apparatus 1 may display images to the outside by using light emitted from the display area DA. The display apparatus 1 may include a substrate 100, and thus, it may be understood that the substrate 100 may include the display area DA and the peripheral area PA.

The substrate 100 may include various materials such as glass, metal, or plastic. In an embodiment, the substrate 100 may include a flexible material. The flexible material may be a material that is readily warped, bendable, foldable, or rollable. The substrate 100 including the flexible material may include ultra-thin glass, metal, or plastic.

Pixels PXsx including various display elements such as a light-emitting diode OLED may be arranged in the display area DA of the substrate 100. The light-emitting diode may be an organic light-emitting diode including an organic emission layer. By way of example, the light-emitting diode may be a light-emitting diode including an inorganic emission layer. The size of the light-emitting diode may be microscales or nanoscales. As an example, the light-emitting diode may be a micro light-emitting diode. By way of example, the light-emitting diode may be a nanorod light-emitting diode. The nanorod light-emitting diode may include gallium nitride (GaN). In an embodiment, a color-converting layer may be disposed on the nano-rod light-emitting diode. The color-converting layer may include quantum dots. By way of example, the light-emitting diode may be a quantum-dot light-emitting diode including a quantum-dot emission layer. The pixels PXsx may be arranged in various configurations such as a stripe configuration, a pentile configuration, a mosaic configuration, and the like to display images.

Although it is shown in FIG. 1 that the display area DA has a rectangular planar shape, the display area DA may have a polygonal shape such as a triangle, a pentagon, a hexagon, and the like, a circular shape, an elliptical shape, an irregular shape, and the like in an embodiment.

The peripheral area PA of the substrate 100 is a region arranged around the display area DA and may be a region in which images are not displayed. Pads may be arranged in the peripheral area PA, wherein various wirings, a printed circuit board or a driver integrated circuit (IC) chip configured to transfer electric signals to the display area DA are attached to the pads.

Figure 2:
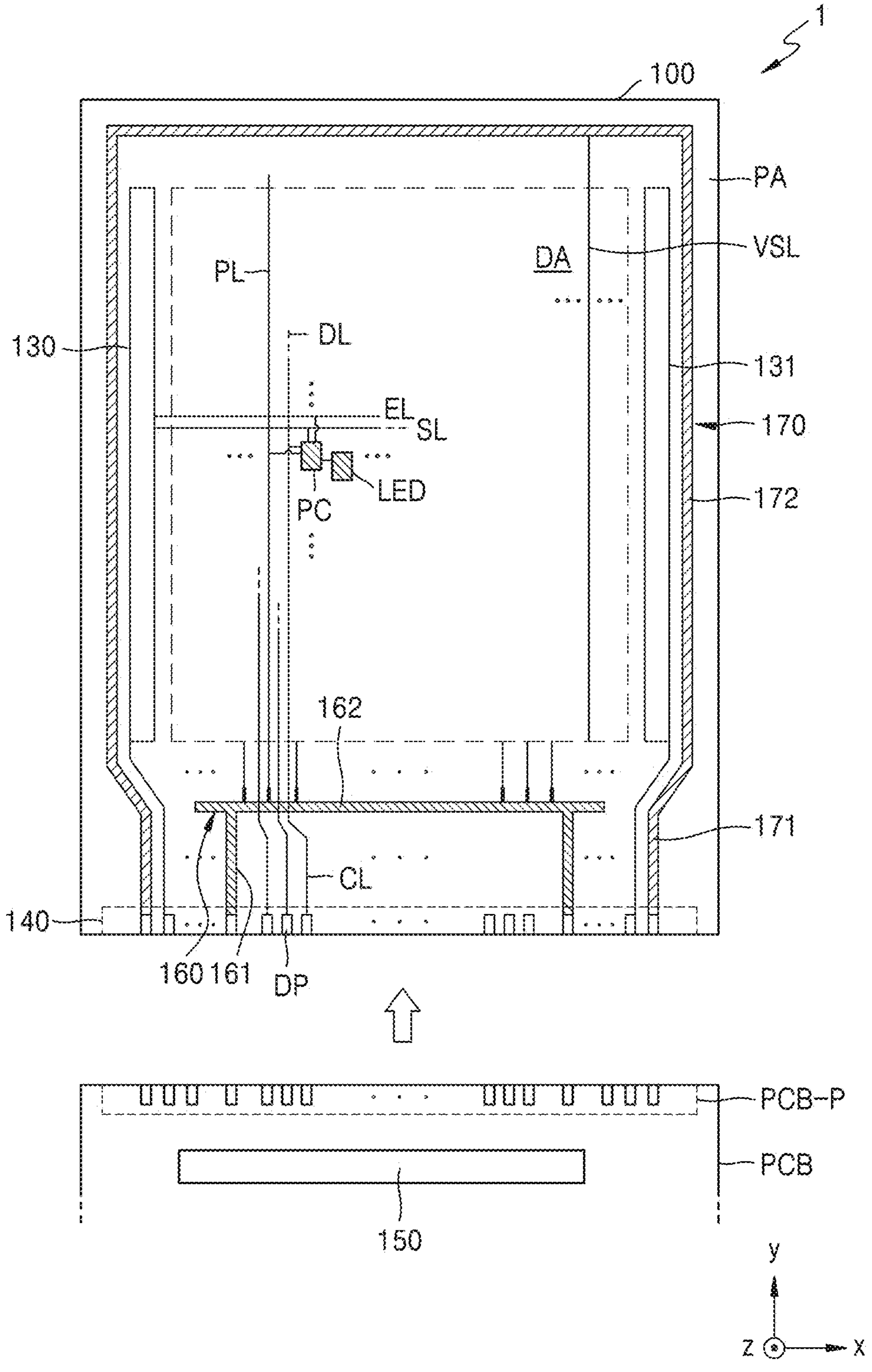
FIG. 2 is a schematic plan view of a display apparatus according to an embodiment.

FIG. 2 is a schematic plan view of the display apparatus 1 according to an embodiment.

Referring to FIG. 2, the display apparatus 1 may include light-emitting diodes LED arranged in the display area DA, and a pixel circuit PC electrically connected to each light-emitting diode LED. The light-emitting diodes LED and the pixel circuits PC may be arranged in a first direction (for example, +x directions) and a second direction (for example, ty directions) in the display area DA. The pixel circuit PC may be electrically connected to scan lines SL, emission control lines EL, data lines DL, and driving voltage lines PL arranged in the display area DA.

The scan lines SL and the emission control lines EL may each extend in the first direction (for example, the ±x directions) and be electrically connected to the pixel circuits PC arranged in the same row. The data lines DL and the driving voltage lines PL may each extend in the second direction (for example, the ±y directions) and be electrically connected to the pixel circuits PC arranged in the same column.

The display apparatus 1 may include a first gate circuit 130, a second gate circuit 131, a first voltage supply line 160, a second voltage supply line 170, and a pad portion 140 arranged in the peripheral area PA.

The first gate circuit 130 and the second gate circuit 131 may each include a scan driving circuit and an emission control driving circuit. The scan driving circuit may be configured to provide scan signals to each pixel circuit PC through the scan line SL. The emission driving circuit may be configured to provide emission control signals to each pixel circuit PC through the emission control line EL.

The second gate circuit 131 may be arranged in parallel to the first gate circuit 130 with the display area DA therebetween. Some of the pixel circuits PC arranged in the display area DA may be electrically connected to the first gate circuit 130, and the others may be connected to the second gate circuit 131. In an embodiment, the second gate circuit 131 may be omitted.

The first voltage supply line 160 and the second voltage supply line 170 may be arranged in the peripheral area PA. The first voltage supply line 160 may include a first sub-line 161 extending in the second direction (for example, the ty directions) toward the end of the substrate 100, and a second sub-line 162 extending in parallel to a first side of the display area DA. The second voltage supply line 170 may have a loop shape having one open side to partially surround the display area DA. The second power supply line 170 may include a first sub-line 171 extending in the second direction (for example, the ±y directions) toward the end of the substrate 100, and a second sub-line 172 extending along a second side, a third side, and a fourth side of the display area DA.

The pad portion 140 may be arranged on one side or a side of the peripheral area PA. The pad portion 140 may include pads such as a data pad DP. The pad portion 140 may be exposed by not being covered by an insulating layer, and electrically connected to a printed circuit board PCB. The pads of the pad portion 140 may be electrically connected to a terminal portion PCB-P of the printed circuit board PCB. The printed circuit board PCB is configured to transfer signals of a controller (not shown) or a voltage to a display panel.

Control signals generated by the controller may be respectively transferred to the first gate circuit 130 and the second gate circuit 131 through the printed circuit board PCB and the pad portion 140.

A driving voltage ELVDD (see FIG. 3) generated by the controller may be transferred to the first voltage supply line 160 through the first sub-line 161 connected to the pad of the pad portion 140. The driving voltage ELVDD may be provided to each pixel circuit PC through the driving voltage line PL connected to the first voltage supply line 160.

A common voltage ELVSS (see FIG. 3) generated by the controller may be transferred to the second voltage supply line 170 through the first sub-line 171 connected to the pad of the pad portion 140. The common voltage ELVSS may be provided to a cathode (or a second electrode) of the light-emitting diode LED connected to the second voltage supply line 170. Common voltage lines VSL may be arranged in the display area DA, wherein the common voltage lines VSL are electrically connected to the second voltage supply line 170. The common voltage lines VSL may be configured to prevent a voltage drop of the second driving voltage that may occur as the area of the display area DA increases.

The data driving circuit 150 may be electrically connected to the data lines DL. A data signal (or a data voltage) of the data driving circuit 150 may be provided to each pixel circuit PC through a connection line CL and the data line DL, wherein the connection line CL is connected to the data pad DP of the pad portion 140, and the data line DL is connected to the connection line CL.

Although it is shown in FIG. 2 that the data driving circuit 150 is disposed on the printed circuit board PCB, the data driving circuit 150 may be disposed on the substrate 100 in an embodiment. As an example, the data driving circuit 150 may be arranged between the pad portion 140 and the first voltage supply line 160.

Figure 3:
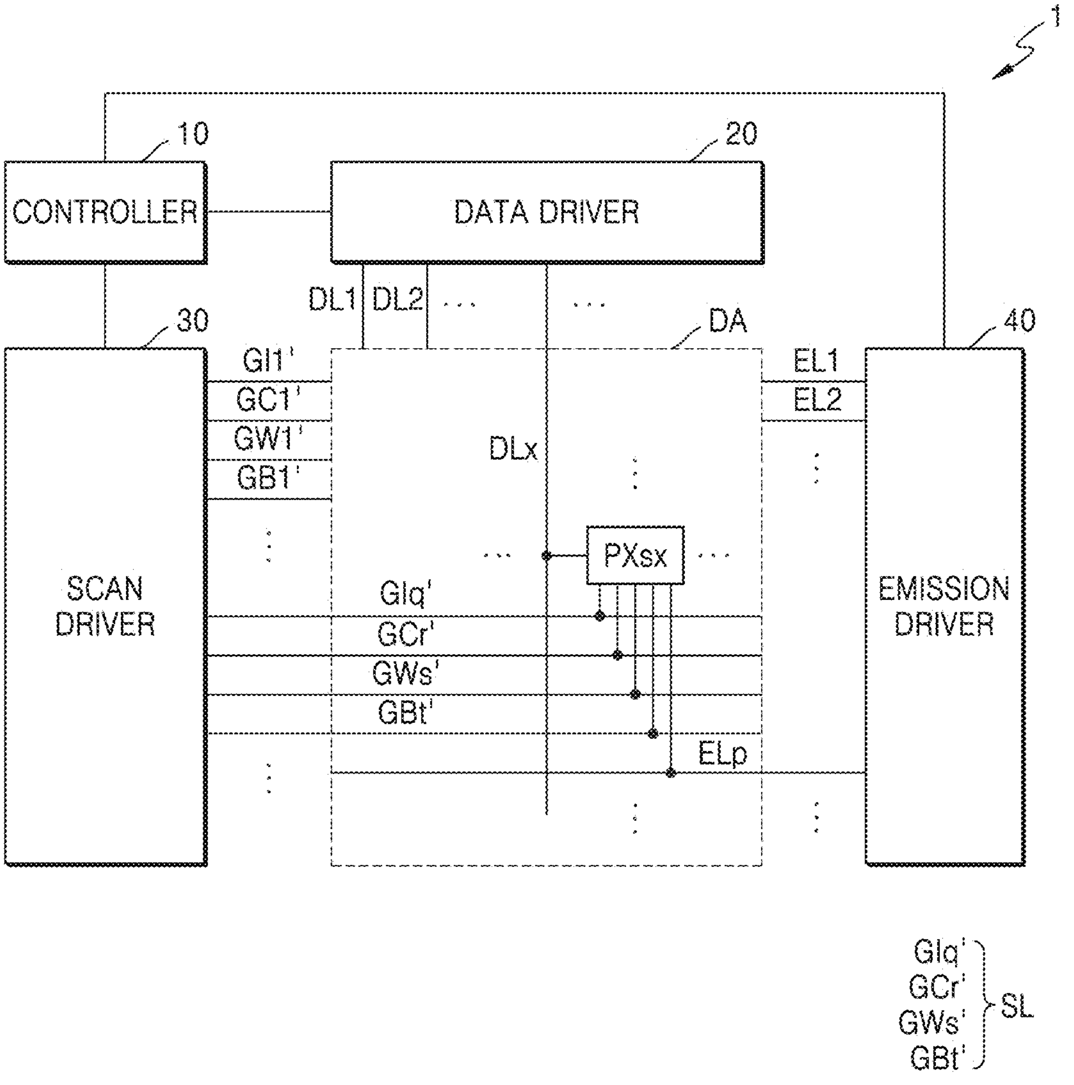
FIG. 3 is a schematic view of a display apparatus according to an embodiment.

FIG. 3 is a schematic view of the display apparatus 1 according to an embodiment.

As shown in FIG. 3, the display apparatus 1 according to an embodiment may include a controller 10, a data driver 20, a scan driver 30, an emission driver 40, and a display area DA. The scan driver 30 and the emission driver 40 respectively correspond to the scan driving circuit and the emission control driving circuit included in the first gate circuit 130 and/or the second gate circuit 131 of FIG. 2.

The controller 10 may be configured to receive an external input signal from an external processor. An external input signal may include a horizontal synchronization signal, a vertical synchronization signal, a data enable signal, RGB data signals, and the like within the spirit and the scope of the disclosure.

A vertical synchronization signal may include pulses. It may be considered that a previous frame period ends and a current frame period starts based on a time point at which pulses of a vertical synchronization signal occur. Accordingly, an interval between adjacent pulses of a vertical synchronization signal may correspond to a 1 frame period. A horizontal synchronization signal may also include pulses. It may be considered that a previous horizontal period ends and a new horizontal period starts based on a time point at which pulses of a horizontal synchronization signal occur. Accordingly, an interval between adjacent pulses of a horizontal synchronization signal may correspond to a 1 horizontal period.

The data enable signal may be maintained at an enable level during given horizontal periods and at a disable level during the remaining periods. During horizontal periods in case that the data enable signal is at an enable level, an RGB data signal may be supplied. During horizontal periods, an RGB data signal may be supplied row by row to pixels in the display area. For reference, pixels connected to the same scan line may be referred to as pixels arranged in the same row. The controller 10 may be configured to generate grayscale values based on RGB data signals to correspond to specification of the display apparatus 1. The controller 10 may be configured to generate control signals to be supplied to the data driver 20, the scan driver 30, the emission driver 40, and the like based on externa input signals to correspond to specification of the display apparatus 1.

The data driver 20 may be configured to generate data signals to be provided to data lines DL1, DL2, . . . , DLx, . . . , using grayscale values and control signals received from the controller 10. As an example, the data driver 20 may be configured to sample grayscale values using clock signals and supply data signals corresponding to the grayscale values to the data lines DL1, DL2, . . . , DLx, . . . , on a row basis of pixels in the display area. Here, x may be a natural number.

The scan driver 30 may be configured to receive clock signals, scan start signals, and the like from the controller 10 and generate scan signals to be provided to scan lines GI1', GC1', GW1', GB1', . . . , GIq', GCr', GWs', GBt', . . . . Here, q, r, s, and t may be natural numbers. Each of scan lines GI1', GC1', GW1', GB1', . . . , GIq', GCr', GWs', GBt', . . . , may correspond to the scan line SL of FIG. 2.

The scan driver 30 may include sub-scan drivers. As an example, a first sub-scan driver may be configured to generate scan signals to be provided to first scan lines GI1', . . . , GIq', . . . . A second sub-scan driver may be configured to generate scan signals to be provided to second scan lines GC1', . . . , GCr', . . . . A third sub-scan driver may be configured to generate scan signals to be provided to third scan lines GW1', . . . , GWs', . . . . A fourth sub-scan driver may be configured to generate scan signals to be provided to fourth scan lines GB1', . . . , GBr', . . . . Each of the sub-scan drivers may include stages connected to each other in the form of shift registers. As an example, scan signals may be generated by sequentially transferring a turn-on level pulse of a scan start signal supplied to a scan start line to the next scan stage. Depending on the case, some sub-scan drivers may be integral.

The emission driver 40 may be configured to receive clock signals, emission suspension signal, and the like from the controller 10 to generate emission signals to be provided to emission lines EL1, EL2, . . . , ELp, . . . . Here, p is a natural number. As an example, the emission driver 40 may be configured to sequentially provide emission signals having a turn-off level pulse to the emission lines EL1, EL2, . . . , ELp, . . . . As an example, the emission driver 40 may be configured in the form of a shift register and configured to generate emission signals by sequentially transferring a turn-off level pulse of an emission suspension signal to the next emission stage under the control of a clock signal.

The substrate may include the display area DA and the peripheral area PA (see FIG. 2) outside the display area DA. These elements may be arranged in the peripheral area PA (see FIG. 2) outside the display area DA.

The display area DA may include the pixels PXsx. The pixel PXsx may include a pixel circuit including a thin-film transistor, and a display element electrically connected to the pixel circuit.

Figure 4:
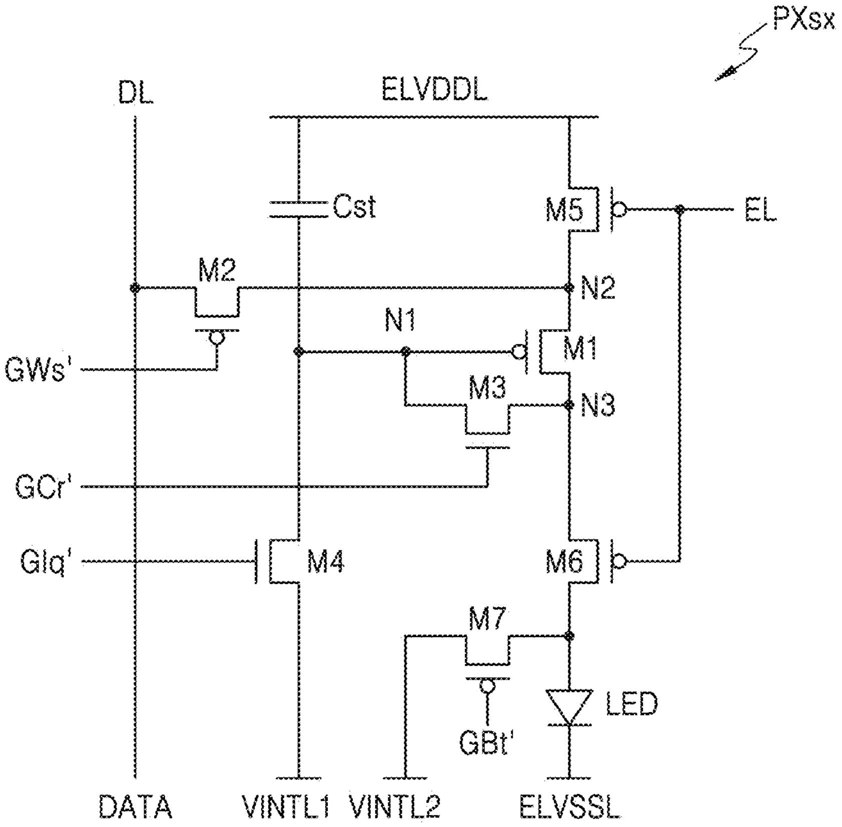
FIG. 4 is an equivalent circuit diagram of a display element and a pixel circuit connected to the display element included in the display apparatus of FIG. 3.

FIG. 4 is an equivalent circuit diagram of a display element and a pixel circuit connected to the display element included in the display apparatus of FIG. 3. As shown in FIG. 4, the display apparatus according to an embodiment may include the light-emitting diode LED as the display element, and the pixel circuit connected to the light-emitting diode LED may include transistors M1, M2, M3, M4, M5, M6, and M7, and a capacitor Cst. The pixel PXsx shown in FIG. 3 may include the pixel circuit and the light-emitting diode LED. The transistors M1, M2, M3, M4, M5, M6, and M7 may be thin-film transistors.

A gate electrode of the transistor M1 may be connected to a node N1, a first electrode may be connected to a node N2, and a second electrode may be connected to a node N3. The first electrode may be one of a source electrode and a drain electrode, and the second electrode may be the other of the source electrode and the drain electrode. Because the transistor M1 is configured to control the amount of current flowing through the light-emitting diode LED, the transistor M1 may be a driving transistor.

A gate electrode of the transistor M2 may be connected to the third scan line GWs' to receive one of third scan signals, a first electrode may be connected to the data line DL, and a second electrode may be connected to the node N2. Because the transistor M2 receives a data signal DATA from the data line DL in case that turned on, the transistor M2 may be a scan transistor.

A gate electrode of the transistor M3 may be connected to the second scan line GCr' to receive one of second scan signals, a first electrode may be connected to the node N1, and a second electrode may be connected to the third node N3. Because the transistor M3 is configured to compensate for a threshold voltage by diode-connecting the transistor M1, which is the driving transistor, the transistor M3 may be a compensation transistor.

A gate electrode of the transistor M4 may be connected to the first scan line GIq' to receive one of first scan signals, a first electrode may be connected to the node N1, and a second electrode may be connected to a first initialization line VINTL1. Because the transistor M4 initializes an electrical potential of the node N1 to which the gate electrode of the transistor M1 is connected, the transistor M4 may be a gate initialization transistor.

A gate electrode of the transistor M5 may be connected to the emission control line EL to receive one of emission signals, a first electrode may be connected to a first power line ELVDDL, and a second electrode may be connected to the node N2. In case that the transistor M5 is turned on, because first power is supplied to the transistor M1, which is the driving transistor, and the light-emitting diode LED is configured to emit light, the transistor M5 may be a first emission transistor.

A gate electrode of the transistor M6 is also connected to the emission control line EL to receive one of emission signals. A first electrode of the transistor M6 may be connected to the node N3, and a second electrode may be electrically connected to the light-emitting diode LED. In case that the transistor M6 is turned on, because the current controlled by the transistor M1, which is the driving transistor, may flow through the light-emitting diode LED, and the light-emitting diode LED is configured to emit light, the transistor M6 may be a second emission transistor.

A gate electrode of the transistor M7 may be connected to the fourth scan line GBt' to receive one of fourth scan signals, a first electrode may be connected to a second initialization line VINTL2, and a second electrode may be electrically connected to the light-emitting diode LED. In case that the transistor M7 is turned on, because the electrical potential of an anode of the light-emitting diode LED is initialized, the transistor M7 may be an anode initialization transistor. Depending on the case, a gate electrode of the transistor M7 may be connected to the third scan line GWs'.

The capacitor Cst may include a first electrode and a second electrode, the first electrode may be connected to the first power line ELVDDL, and the second electrode may be connected to the node N1.

A first electrode (for example, an anode) of the light-emitting diode LED may be connected to the second electrode of the transistor M6 and the second electrode of the seventh transistor M7, and a second electrode (for example, a cathode) may be connected to the second power line ELVSSL. During an emission period of the light-emitting diode LED, a voltage applied to the second power line ELVSSL may be set lower than a voltage applied to the first power line ELVDDL. The light-emitting diode LED may be an organic the light-emitting diode or an inorganic the light-emitting diode. Although it is shown in FIG. 4 that the pixel PXsx may include one light-emitting diode LED, this is an example. In case that needed, the pixel PXsx may include light-emitting diodes connected in series, parallel, or series-parallel.

Referring to FIG. 4, the transistors M1, M2, M5, M6, and M7 are P-type transistors and may include a semiconductor layer including polycrystalline silicon. Polycrystalline silicon has high electron mobility, and accordingly, a transistor including polycrystalline silicon may have fast driving characteristics.

The transistors M3 and M4 are N-type transistors and may include a semiconductor layer including an oxide semiconductor. An oxide semiconductor has a low charge mobility compared to polycrystalline silicon. Accordingly, a transistor including an oxide semiconductor may have a smaller amount of leakage current generated in a turn-off state than a transistor including polycrystalline silicon.

Embodiments are not limited to the pixel circuit shown in FIG. 4, and the number of transistors included in the pixel circuit PC and whether the transistors are P-type/N-type transistors may be modified in case that needed.

Figure 5:
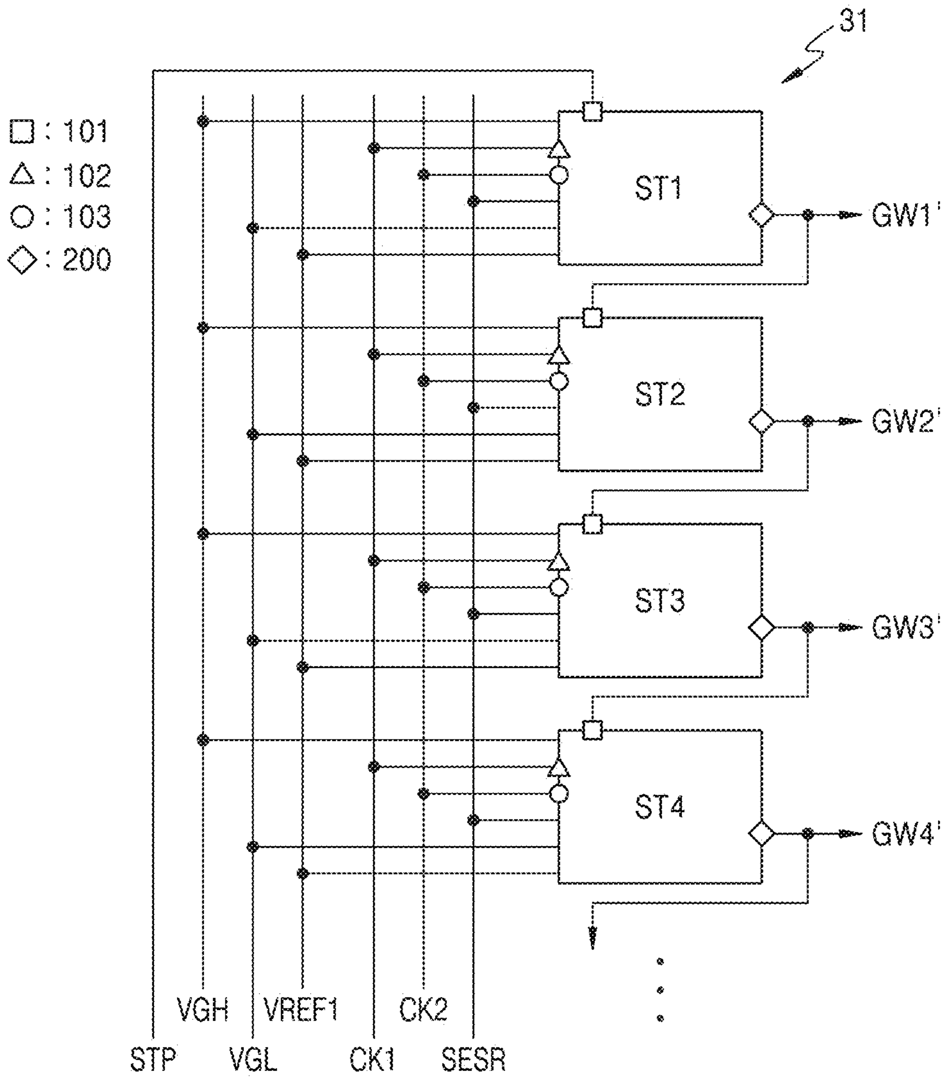
FIG. 5 is a block diagram for explaining a scan driver included in a display apparatus according to an embodiment.

FIG. 5 is a block diagram for explaining a scan driver 31 included in a display apparatus according to an embodiment.

Hereinafter, for convenience of description, the case where the scan driver 31 is a third sub-scan driver configured to supply third scan signals to third scan lines GW1', GW2', GW3', GW4', . . . , is described. As shown in FIG. 5, the scan drive 31 may include stages ST1, ST2, ST3, ST4, . . . .

Each of the stages ST1, ST2, ST3, and ST4 may include a first input terminal 101, a second input terminal 102, a third input terminal 103, common input terminals, and an output terminal 200. Each of the stages ST1, ST2, ST3, and ST4 may be configured to receive a high-level voltage VGH, a low-level voltage VGL, a first reference voltage VREF1, and an initialization signal SESR through the common input terminals.

The first input terminal 101 of the first stage ST1 may be configured to receive a scan start signal STP. The first input terminals 101 of the stages ST2, ST3, ST4, . . . , after the first stage ST1 may be connected to the output terminal 200 of the previous stage. For example, the first input terminals 101 of the stages ST2, ST3, ST4, . . . , after the first stage ST1 may be configured to receive, as a carry signal, a third scan signal output from the previous stage.

The second input terminal 102 and the third input terminal 103 of each of the stages ST1, ST2, ST3, and ST4 may be configured to receive different clock signals CK1 and CK2 from each other. As an example, the second input terminals 102 of the stages ST1, ST2, ST3, and ST4 may be configured to alternately receive a first clock signal CK1 and a second clock signal CK2. As an example, the second input terminals 102 of the odd-numbered stages ST1 and ST3 may be configured to receive a first clock signal CK1. In this case, the second input terminals 102 of the even-numbered stages ST2 and ST4 may be configured to receive a second clock signal CK2.

The third input terminals 103 of the stages ST1, ST2, ST3, and ST4 may be configured to alternately receive a second clock signal CK2 and a first clock signal CK1. As an example, the third input terminals 103 of the odd-numbered stages ST1 and ST3 may be configured to receive a second clock signal CK2. In this case, the third input terminals 103 of the even-numbered stages ST2 and ST4 may be configured to receive a first clock signal CK1.

Figure 6:
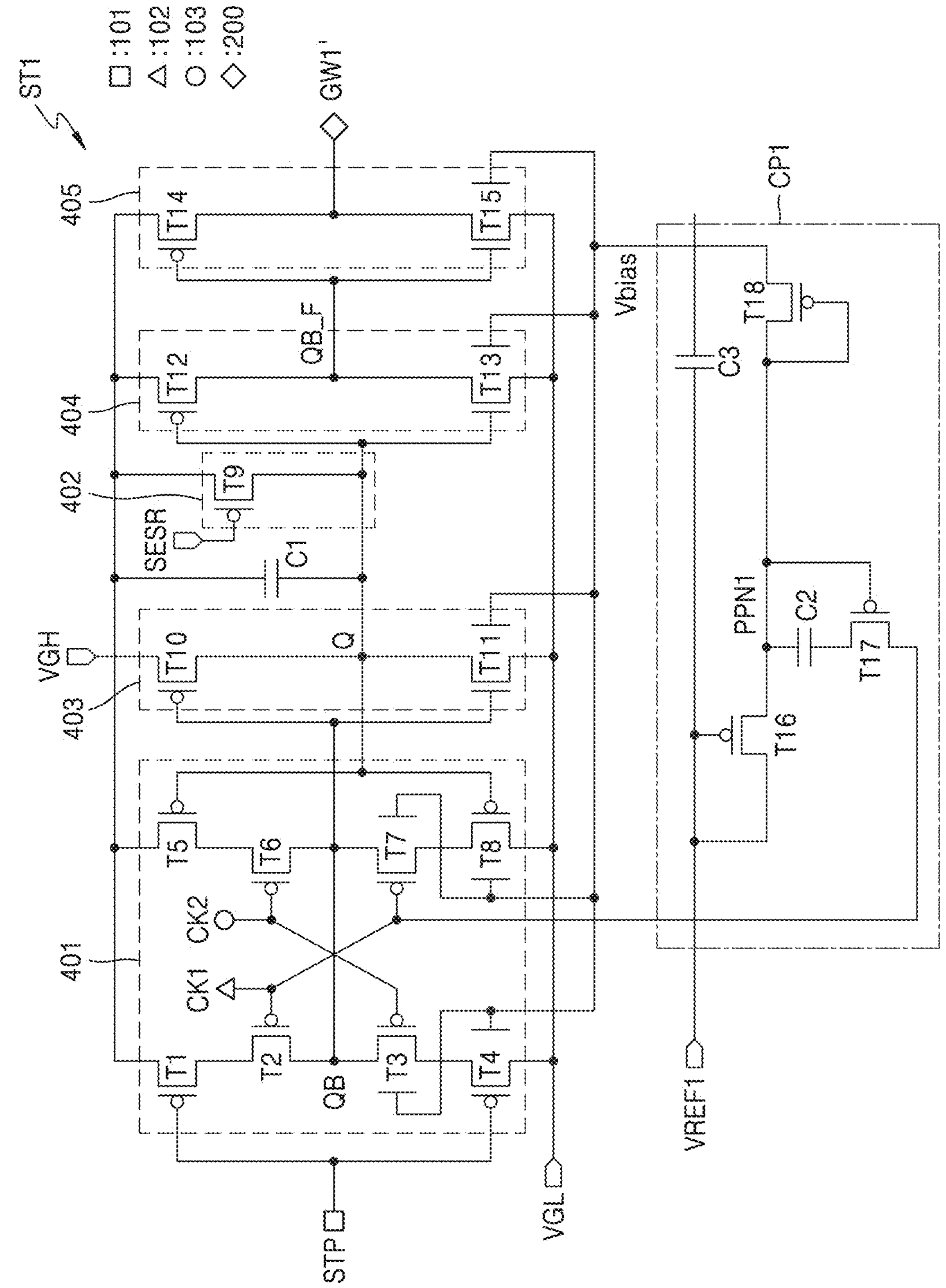
FIG. 6 is a circuit diagram for explaining a stage included in the scan driver of FIG. 5.

FIG. 6 is a circuit diagram for explaining a stage included in the scan driver of FIG. 5. FIG. 6 explains, as an example, the first stage ST1 is implemented using a complementary metal oxide semiconductor (CMOS). The first stage ST1 may include a first node setting portion 401, an initializer 402, a second node setting portion 403, a third node setting portion 404, an output unit 405, and a first charge pump CP1. Because other stages ST2, ST3, ST4, . . . have the same construction as the construction of the first stage ST1 except that the first input terminal 101 receives a carry signal, description of the same portions is omitted.

The first node setting portion 401 may be configured to charge the voltage of the first node QB to a high level in case that a scan start signal STP is at a low level and a first clock signal CK1 is at a low level. The first node setting portion 401 may include the first transistor T1 to the eighth transistor T8. The first node setting portion 401 may include at least one N-type transistor. It is shown in FIG. 5 that the third transistor T3, the fourth transistor T4, the seventh transistor T7, and the eighth transistor T8 are N-type transistors.

A first electrode of the first transistor T1, which is a P-type transistor, may be configured to receive a voltage of a high-level VGH, and a gate electrode may be configured to receive a scan start signal STP. A first electrode of the second transistor T2, which is a P-type transistor, may be connected to the second electrode of the first transistor T1, a second electrode may be connected to the first node QB, and a gate electrode may be configured to receive a first clock signal CK1. A first electrode of the third transistor T3, which is an N-type transistor, may be connected to the first node QB, and a gate electrode may be configured to receive a second clock signal CK2. A first electrode of the fourth transistor T4, which is an N-type transistor, may be connected to the second electrode of the third transistor T3, a second electrode may be configured to receive a voltage of a low-level VGL, and a gate electrode may be configured to receive a scan start signal STP.

A first electrode of the fifth transistor T5, which is a P-type transistor, may be configured to receive a voltage of a high-level VGH, and a gate electrode may be connected to a second node Q. A first electrode of the sixth transistor T6, which is a P-type transistor, may be connected to the second electrode of the fifth transistor T5, a second electrode may be connected to the first node QB, and a gate electrode may be configured to receive a second clock signal CK2. A first electrode of the seventh transistor T7, which is an N-type transistor, may be connected to the first node QB, and a gate electrode may be configured to receive a first clock signal CK1. A first electrode of the eighth transistor T8, which is an N-type transistor, may be connected to the second electrode of the seventh transistor T7, a second electrode may be configured to receive a voltage of a low-level VGL, and a gate electrode may be connected to the second node Q.

The initializer 402 may include a ninth transistor T9. A first electrode of the ninth transistor T9, which is a P-type transistor, may be configured to receive a voltage of a high-level VGH, a second electrode may be connected to the second node Q, and a gate electrode may be configured to receive an initialization signal SESR. The initializer 402 may be configured to initialize one of the first node QB, the second node Q, and a third node QB_F depending on a logic level of the initialization signal SESR. It is shown in FIG. 5 that the initializer 402 initializes the second node Q in case that an initialization signal SESR is a low level. The initialized second node Q may be in a state charged with a high level.

The second node setting portion 403 may be configured to charge the voltage of the second node Q to a high level in case that the voltage of the first node QB is at a low level, and discharge the voltage of the second node Q to a low level in case that the voltage of the first node QB is at a high level. The second node setting portion 403 may include a tenth transistor T10 and an eleventh transistor T11. The second node setting portion 403 may include at least one N-type transistor.

A first electrode of the tenth transistor T10, which is a P-type transistor, may be configured to receive a voltage of a high-level VGH, a second electrode may be connected to the second node Q, and a gate electrode may be connected to the first node QB. A first electrode of the eleventh transistor T11, which is an N-type transistor, may be connected to the second node Q, a second electrode may be configured to receive a voltage of a low-level VGL, and a gate electrode may be connected to the first node QB.

The third node setting portion 404 may be configured to charge the voltage of the third node QB_F to a high level in case that the voltage of the second node Q is at a low level, and discharge the voltage of the third node QB_F to a low level in case that the voltage of the second node Q is at a high level. The third node setting portion 404 may include a twelfth transistor T12 and a thirteenth transistor T13. The third node setting portion 404 may include at least one N-type transistor.

A first electrode of the twelfth transistor T12, which is a P-type transistor, may be configured to receive a voltage of a high-level VGH, a second electrode may be connected to the third node QB_F, and a gate electrode may be connected to the second node Q. A first electrode of the thirteenth transistor T13, which is an N-type transistor, may be connected to the third node QB_F, a second electrode may be configured to receive a voltage of a low-level VGL, and a gate electrode may be connected to the second node Q.

The output unit 405 may be configured to output a scan signal of a high level VGH to the output terminal 200 in case that the voltage of the third node QB_F is at a low level and output a scan signal of a low level VGL to the output terminal 200 in case that the voltage of the third node QB_F is at a high level. The output unit 405 may include a fourteenth transistor T14 and a fifteenth transistor T15. The output unit 405 may include at least one N-type transistor.

A first electrode of the fourteenth transistor T14, which is a P-type transistor, may be configured to receive a voltage of a high-level VGH, a second electrode may be connected to the output terminal 200, and a gate electrode may be connected to the third node QB_F. A first electrode of the fifteenth transistor T15, which is an N-type transistor, may be connected to the output terminal 200, a second electrode may be configured to receive a voltage of a low level VGL, and a gate electrode may be connected to the third node QB_F.

A first electrode of the first stage ST1 may be configured to receive a voltage of a high level VGH, and a second electrode may include a first capacitor C1 connected to the second node Q. Because the first capacitor C1 has a purpose of maintaining the voltage of the second node Q, the first electrode may be configured to receive a voltage of a low level VGL. In case that a parasitic capacitance of the second node Q is sufficient depending on a layout, the first capacitor C1 may be omitted.

The first charge pump CP1 may be configured to supply a bias voltage Vbias to a back gate electrode of at least one N-type transistor included in each of the first node setting portion 401, the second node setting portion 403, the third node setting portion 404, and the output unit 405. Accordingly, the first charge pump CP1 may be configured to supply the bias voltage Vbias to the back gate electrodes of the third transistor T3, the fourth transistor T4, the seventh transistor T7, the eighth transistor T8, the eleventh transistor T11, the thirteenth transistor T13, and the fifteenth transistor T15.

A semiconductor layer included in the transistors T3, T4, T7, T8, T11, T13, and T15 may include an oxide semiconductor. Depending on the kind, an oxide semiconductor may have a negative threshold voltage. Accordingly, the transistors T3, T4, T7, T8, T11, T13, and T15 may be set to have a positive threshold voltage by applying a bias voltage Vbias less than the voltage of a low level VGL to the back gate electrodes of the transistors T3, T4, T7, T8, T11, T13, and T15.

The first charge pump CP1 may include a sixteenth transistor T16 to an eighteenth transistor T18, a second capacitor C2, and a third capacitor C3. The sixteenth transistor T16 to the eighteenth transistor T18 may be P-type transistors.

A gate electrode and a first electrode of the sixteenth transistor T16 may be configured to receive a first reference voltage VREF1, and a second electrode may be connected to a fourth node PPN1. A first electrode of the second capacitor C2 may be connected to the fourth node PPN1. A first electrode of the seventeenth transistor T17 may be connected to a second electrode of the second capacitor C2, a second electrode may be configured to receive a first clock signal CK1, and a gate electrode may be connected to the fourth node PPN1. Depending on the case, the second electrode of the seventeenth transistor T17 may be configured to receive a second clock signal CK2. A first electrode and a gate electrode of the eighteenth transistor T18 may be connected to the fourth node PPN1, and a second electrode may be configured to supply the bias voltage Vbias. A first electrode of the third capacitor C3 may be configured to receive the first reference voltage VREF1, and a second electrode may be connected to the second electrode of the eighteenth transistor T18. Because the third capacitor C3 has a purpose of maintaining the voltage of the bias voltage Vbias, the first electrode may be configured to receive a voltage of a low level VGL. Depending on the case, in case that a parasitic capacitance for the bias voltage Vbias is sufficient, the third capacitor C3 may be omitted.

Figure 7:
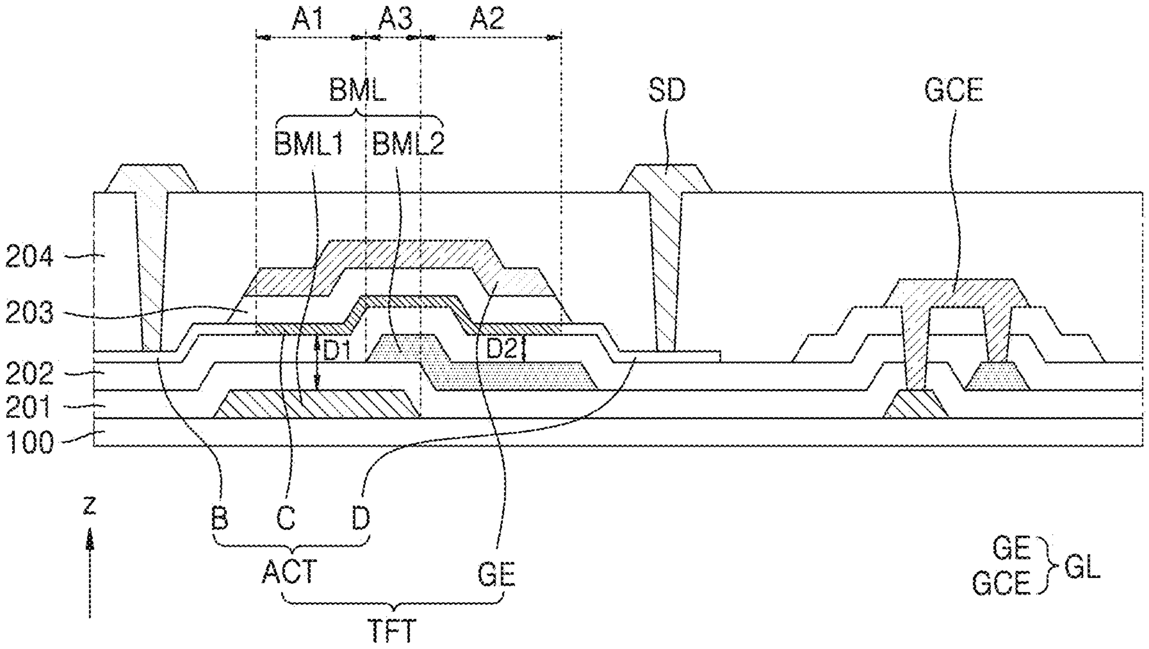
FIG. 7 is a schematic cross-sectional view of a display apparatus according to an embodiment.

FIG. 7 is a schematic cross-sectional view of a display apparatus according to an embodiment and shows a schematic cross-section of a thin-film transistor and upper/lower portions thereof that may be included in the pixel circuit PC (see FIG. 2), the scan driver 30 (see FIG. 3), and/or the emission driver 40 (see FIG. 3).

Referring to FIG. 7, a bottom metal layer BML, a semiconductor layer ACT, a gate conductive layer GL, and a connection electrode layer SD may be sequentially stacked on the substrate 100. The bottom metal layer BML may include a first bottom metal layer BML1 and a second bottom metal layer BML2. The gate conductive layer GL may include a gate electrode GE and a gate connection electrode GCE.

The substrate 100 may include an insulating material such as glass, quartz, a polymer resin or the like within the spirit and the scope of the disclosure. The substrate 100 may be a rigid substrate or a flexible substrate that is bendable, foldable, and rollable. As an example, the substrate 100 may include a polymer resin such as polyethersulfone, polyacrylate, polyetherimide, polyethylene naphthalate, polyethylene terephthalate, polyphenylene sulfide, polyarylate, polyimide, polycarbonate, or cellulose acetate propionate. The substrate 100 may have a multi-layered structure including a layer that may include the polymer resin and an inorganic layer (not shown). As an example, the substrate 100 may include two layers including the polymer resin, and an inorganic barrier layer therebetween.

A thin-film transistor layer TFT may be disposed over the substrate 100. The thin-film transistor TFT may include the semiconductor layer ACT and the gate electrode GE overlapping a channel region C of the semiconductor layer ACT. The semiconductor layer ACT may include a silicon-based semiconductor material, for example, polycrystalline silicon. In an embodiment, the semiconductor layer ACT may include an oxide-based semiconductor material. As an example, the semiconductor layer ACT may include Zn-oxide-based material, for example, include Zn-oxide, In—Zn oxide, and Ga—In—Zn oxide. In an embodiment, the semiconductor layer ACT may include In—Ga—Zn—O (IGZO), In—Sn—Zn—O (ITZO), or In—Ga—Sn—Zn—O (IGTZO) semiconductor containing metal such as indium (In), gallium (Ga), and stannum (Sn) in ZnO.

The semiconductor layer ACT may include the channel region C, a first region B, and a second region D respectively arranged on two opposite sides of the channel region C. The first region B and the second region D are regions including impurities of higher concentration than that of the channel region C. One of the first region B and the second region D may correspond to a source region, and the other may correspond to a drain region.

A gate insulating layer 203 may be disposed between the semiconductor layer ACT and the gate electrode GE. As shown in FIG. 7, the gate insulating layer 203 may be patterned to correspond to the gate electrode GE. By way of example, in an embodiment, the gate insulating layer 203 may extend to the peripheral portion of the gate electrode GE. The gate insulating layer 203 may include an inorganic insulating material such as silicon nitride, silicon oxynitride, and silicon oxide, and include a single-layered structure or a multi-layered structure including the above inorganic insulating materials.

The gate electrode GE may be disposed over the semiconductor layer ACT and may overlap the channel region C. The gate electrode GE may include a conductive material including molybdenum (Mo), aluminum (Al), copper (Cu), and titanium (Ti) and have a single-layered structure or a multi-layered structure including the above materials.

According to an embodiment, the first bottom metal layer BML1 and the second bottom metal layer BML2 may be disposed between the substrate 100 and the semiconductor layer ACT. The first bottom metal layer BML1 and the second bottom metal layer BML2 may be disposed on different layers. For example, the first bottom metal layer BML1 may be disposed on the substrate 100, a first buffer layer 201 may cover the first bottom metal layer BML1, and the second bottom metal layer BML2 may be disposed on the first buffer layer 201. A second buffer layer 202 may be disposed between the second bottom metal layer BML2 and the semiconductor layer ACT.

The first buffer layer 201 and the second buffer layer 202 may be configured to prevent impurities from penetrating the semiconductor layer ACT of the thin-film transistor TFT. The first buffer layer 201 and the second buffer layer 202 may include an inorganic insulating material such as silicon nitride, silicon oxynitride, and silicon oxide, and include a single layer or a multi-layer including the above inorganic insulating materials.

The first bottom metal layer BML1 and the second bottom metal layer BML2 may include aluminum (Al), copper (Cu), and/or titanium (Ti), and include a single layer or a multi-layer including the above materials. Each of the first bottom metal layer BML1 and the second bottom metal layer BML2 may have a two-layered structure of titanium layer/aluminum layer. A thickness of the first bottom metal layer BML1 may be in a range of about 1,000 Å to about 3,000 Å. A thickness of the second bottom metal layer BML2 may be in a range of about 3,000 Å to about 5,000 Å.

The first bottom metal layer BML1 and the second bottom metal layer BML2 may be electrically connected to each other. In an embodiment, the gate connection electrode GCE may be electrically connected to the first bottom metal layer BML1 and the second bottom metal layer BML2 through contact holes. The gate connection electrode GCE may be connected to the first bottom metal layer BML1 through a contact hole formed by removing a portion of each of the first buffer layer 201, the second buffer layer 202, and the gate insulating layer 203. The gate connection electrode GCE may be connected to the second bottom metal layer BML2 through a contact hole formed by removing each of the second buffer layer 202 and the gate insulating layer 203. In an embodiment, the gate connection electrode GCE may be integral with the gate electrode GE. The gate connection electrode GCE may be electrically connected to the gate electrode GE.

The first bottom metal layer BML1, the second bottom metal layer BML2, and the gate electrode GE may be configured to receive the same signal. Each of the first bottom metal layer BML1 and the second bottom metal layer BML2 may be electrically connected to the gate electrode GE. The first bottom metal layer BML1 and the second bottom metal layer BML2 may be configured to receive a gate voltage.

In a plan view (by way of example, when viewed in a direction perpendicular to the substrate 100), each of the first bottom metal layer BML1 and the second bottom metal layer BML2 may overlap at least a portion of the channel region C of the thin-film transistor TFT. A portion of the channel region C of the thin-film transistor TFT may overlap the first bottom metal layer BML2 and/or the second bottom metal layer BML2.

The channel region C may include a first region A1 and a second region A2. The first region A1 of the channel region C may overlap the first bottom metal layer BML1 and may not overlap the second bottom metal layer BML2. The second region A2 of the channel region C may overlap the second bottom metal layer BML2 and may not overlap the first bottom metal layer BML1.

The channel region C may include a third region A3. The third region A3 may overlap both the first bottom metal layer BML1 and the second bottom metal layer BML2. For example, at least portions of the first bottom metal layer BML1 and the second bottom metal layer BML2 overlap each other in a region where the first bottom metal layer BML1 and the second bottom metal layer BML2 overlaps the channel region C. Because the channel region C may include the third region A3 overlapping both the first bottom metal layer BML1 and the second bottom metal layer BML2, a portion of the channel region C may be prevented from not being covered by at least one of the first bottom metal layer BML1 and the second bottom metal layer BML2.

According to the above description, a distance between the channel region C and the bottom metal layer BML adjacent thereto in the first region A1 may be a first distance D1 between the channel region C and the first bottom metal layer BML1, and a distance between the channel region C and the bottom metal layer BML adjacent thereto in the second region A2 and the third region A3 may be a second distance D2 between the channel region C and the second bottom metal layer BML2.

The first distance D1 may be a size equal to a sum of the thickness of the first buffer layer 201 and the thickness of the second buffer layer 202, and the second distance D2 may be a size equal to the thickness of the second buffer layer 202. For example, the channel region C and the bottom metal layer BML in the first region A1 may have the first distance D1, and the channel region C and the bottom metal layer BML in the second region A2 and the third region A3 may have the second distance D2 less than the first distance D1. The first distance D1 is greater than the second distance D2.

According to an embodiment, because the bottom metal layer BML may include the first bottom metal layer BML1 and the second bottom metal layer BML2 disposed on different layers from each other, the amount of change in the threshold voltage due to positive bias temperature stress (PBTS) may be reduced. As an example, in the case where the first bottom metal layer BML1 is not disposed below the channel region C and only the second bottom metal layer BML2 is disposed, a distance between the channel region C and the second bottom metal layer BML2 to which the gate voltage is applied has the second distance D2 of a relatively small size. Unlike this, according to an embodiment, because the first bottom metal layer BML1 having the first distance D1 from the channel region C is disposed below a portion of the channel region C, and the second bottom metal layer BML2 having the second distance D2 from the channel region C is disposed below another portion of the channel region C, a distance between the bottom metal layer BML and the semiconductor layer ACT increases, an E-field between the bottom metal layer BML and the semiconductor layer ACT is reduced, and thus, PBTS characteristics may be improved.

Reduction in an on-current of the thin-film transistor TFT may be prevented compared to the case where only the second bottom metal layer BML2 is disposed below the channel region C and the second distance D2 is increased.

An interlayer insulating layer 204 may be disposed on the gate conductive layer GL. The interlayer insulating layer 204 may include an inorganic insulating material such as silicon oxynitride, and have a single layer or a multi-layer including the inorganic insulating materials.

The connection electrode layer SD may be disposed on the interlayer insulating layer 204. The connection electrode layer SD may include a source electrode and a drain electrode of the thin-film transistor TFT. The connection electrode layer SD may include aluminum (Al), copper (Cu), and/or titanium (Ti), and include a single layer or a multi-layer including the above materials.

In an embodiment, the thin-film transistor TFT and the bottom metal layer BML shown in FIG. 7 may be included in the pixel circuit PC (see FIG. 2) of FIG. 2. In this case, a display element may be further disposed on the connection electrode layer SD of FIG. 7. The display element may be electrically connected to the thin-film transistor TFT and may include a pixel electrode, an emission layer, and an opposite electrode.

The pixel electrode may include a reflective layer and a transparent or semi-transparent electrode layer on the reflective layer, wherein the reflective layer may include at least one of Ag, Mg, Al, Pt, Pd, Au, Ni, Nd, Ir, Cr, and compound thereof. The transparent or semi-transparent electrode layer may include at least one of indium tin oxide (ITO), indium zinc oxide (IZO), zinc oxide (ZnO), indium oxide ($In_2O_3$), indium gallium oxide (IGO), and aluminum zinc oxide (AZO). In an embodiment, the pixel electrode may include ITO/Ag/ITO.

The emission layer may include an organic emission layer. The organic emission layer may include an organic material including a fluorescent or phosphorous material emitting red, green, blue, or white light. The organic emission layer may include a low molecular weight organic material or a polymer organic material.

The opposite electrode may be a light-transmissive electrode or a reflective electrode. In an embodiment, the opposite electrode may be a transparent or semi-transparent electrode and may include a metal thin film including Li, Ca, LiF/Ca, LiF/Al, Al, Ag, Mg, or compound thereof and having a small work function. A transparent conductive oxide (TCO) layer such as ITO, IZO, ZnO, or $In_2O_3$ may be further arranged on the metal thin film.

Figure 8:
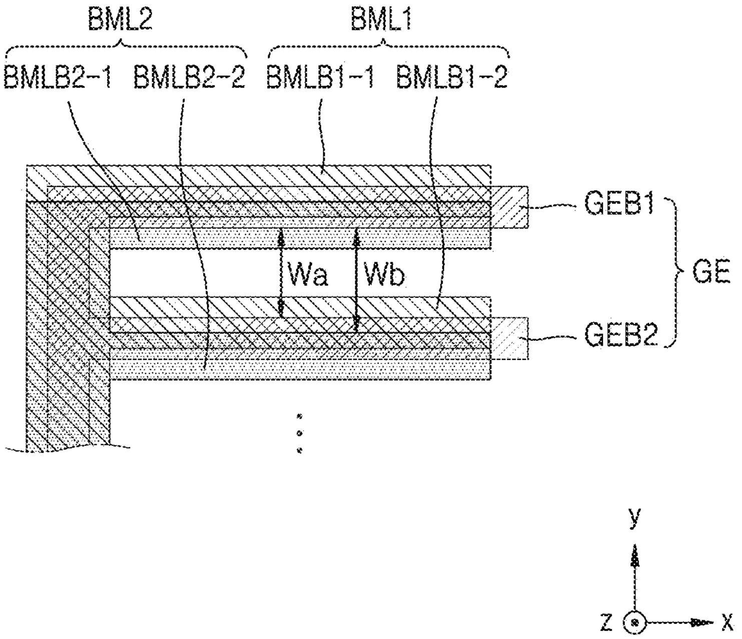
FIG. 8 is a schematic plan view of a bottom metal layer and a gate electrode included in a display apparatus according to an embodiment.

FIG. 8 is a schematic plan view of a display apparatus according to an embodiment and shows, as an example, a planar shape of the bottom metal layer BML and the gate electrode GE of FIG. 7. FIG. 8 shows an embodiment in which the bottom metal layer BML and the thin-film transistor TFT of FIG. 7 are included in the emission driver 40 (see FIG. 3).

Referring to FIG. 8, the gate electrode GE may include branch electrodes extending in the first direction (for example, the ±x direction). The branch electrodes may be arranged in a second direction (for example, the ±y direction). An end of the branch electrodes may be connected in the second direction (for example, the ±y direction) and electrically connected to each other. Referring to FIG. 8, the gate electrode GE may include a first branch electrode GEB1 and a second branch electrode GEB2 each extending in the first direction (for example, the ±x direction).

The first bottom metal layer BML1 may include first branch metals extending in the first direction (for example, the ±x direction), and the second bottom metal layer BML2 may include second branch metals extending in the first direction (for example, the ±x direction). The first branch metals may be respectively arranged to correspond to the branch electrodes. The second branch metals may be respectively arranged to correspond to the branch electrodes.

The first bottom metal layer BML1 may include a first-1 branch metal BMLB1-1 corresponding to the first branch electrode GEB1, and a first-2 branch metal BMLB1-2 corresponding to the second branch electrode GEB2. The first-1 branch metal BMLB1-1 may overlap at least a portion of the first branch electrode GEB1, and the first-2 branch metal BMLB1-2 may overlap at least a portion of the second branch electrode GEB2.

The second bottom metal layer BML2 may include a second-1 branch metal BMLB2-1 corresponding to the first branch electrode GEB1, and a second-2 branch metal BMLB2-2 corresponding to the second branch electrode GEB2. The second-1 branch metal BMLB2-1 may overlap at least a portion of the first branch electrode GEB1, and the second-2 branch metal BMLB2-2 may overlap at least a portion of the second branch electrode GEB2.

In a region of the first branch electrode GEB1, the first branch electrode GEB1 may overlap both the first-1 branch metal BMLB1-1 and the second-1 branch metal BMLB2-1. In a region of the second branch electrode GEB2, the second branch electrode GEB2 may overlap both the first-2 branch metal BMLB1-2 and the second-2 branch metal BMLB2-2.

In an embodiment, the first-1 branch metal BMLB1-1 may overlap one side or a side of the first branch electrode GEB1 and may not overlap another side of the first branch electrode GEB1. The second-1 branch metal BMLB2-1 may overlap the other side of the first branch electrode GEB1 and may not overlap one side or a side of the first branch electrode GEB1. One side or a side and the other side of the first branch electrode GEB1 may denote the edges of the first branch electrode GEB1 extending the first direction (for example, the ±x direction).

Likewise, the first-2 branch metal BMLB1-2 may overlap one side or a side of the second branch electrode GEB2 and may not overlap another side of the second branch electrode GEB2. The second-2 branch metal BMLB2-2 may overlap the other side of the second branch electrode GEB2 and may not overlap one side or a side of the second branch electrode GEB2. One side or a side and the other side of the second branch electrode GEB2 may denote the edges of the second branch electrode GEB2 extending the first direction (for example, the ±x direction).

Accordingly, a width Wa in the second direction (for example, the ±y direction) between the first-1 branch metal BMLB1-1 and the second branch electrode GEB2 may be less than a width Wb in the second direction (for example, the ±y direction) between the first-1 branch metal BMLB1-1 and the second-2 branch metal BMLB2-2.

Although FIG. 8 shows only two branch electrodes among the branch electrodes of the gate electrode GE, the branch electrodes may include three or more branch electrodes adjacent to the first branch electrode GEB1 and the second branch electrode GEB2 in the second direction (for example, the ±y direction) in an embodiment. Likewise, corresponding to the branch electrodes, three or more first branch metals and three or more second branch metals may be provided. As the number of branch electrodes increases, an area occupied by the thin-film transistor including the gate electrode GE increases and may be more affected by PBTS.

According to an embodiment, one side or a side of each of the branch electrodes may overlap the first branch metal of the first bottom metal layer BML1, and another side may overlap the second branch metal of the second bottom metal layer BML2. Accordingly, because a distance between the semiconductor layer and the bottom metal layer may be relatively large in one side or a side of the channel region, and a distance between the semiconductor layer and the bottom metal layer may be relatively shorter in the other side of the channel region, as described above with reference to FIG. 7, reduction in an on-current of the thin-film transistor may be prevented and a distance between the semiconductor layer and the bottom metal layer is increased, and thus, reliability of the display apparatus may be improved.

Figure 9:
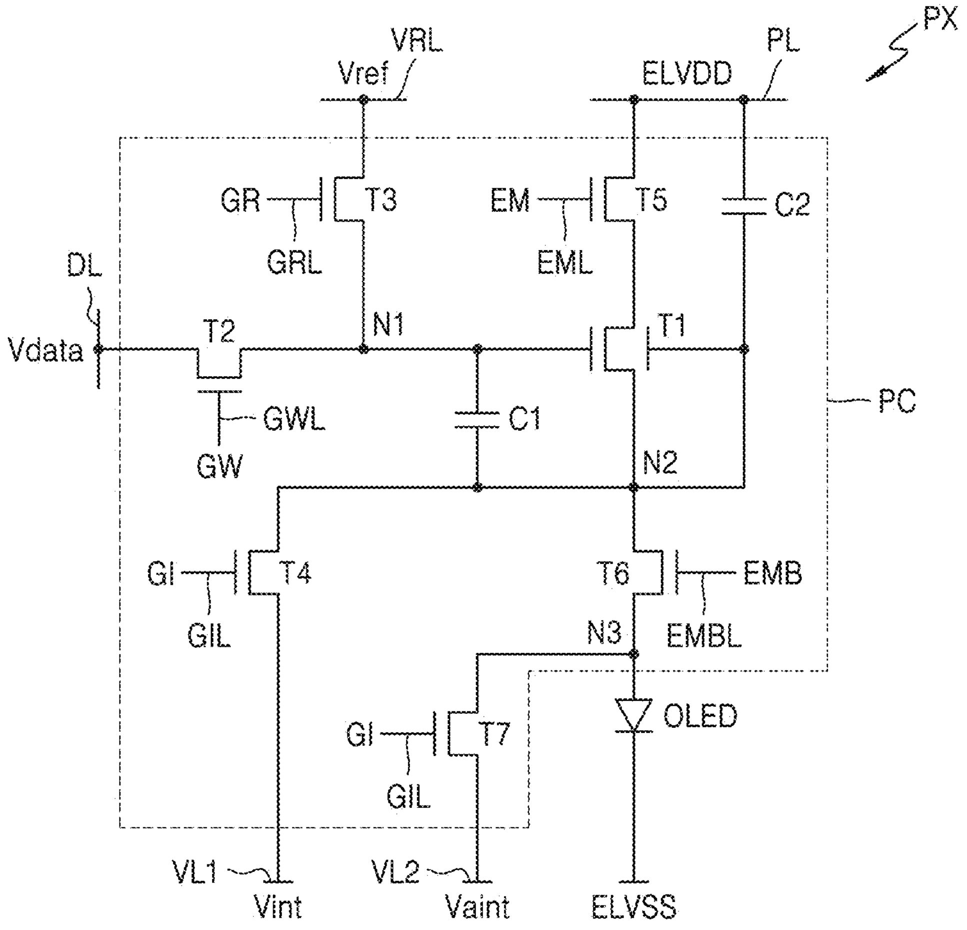
FIG. 9 is an equivalent circuit diagram of a sub-pixel according to an embodiment.
Figure 10:
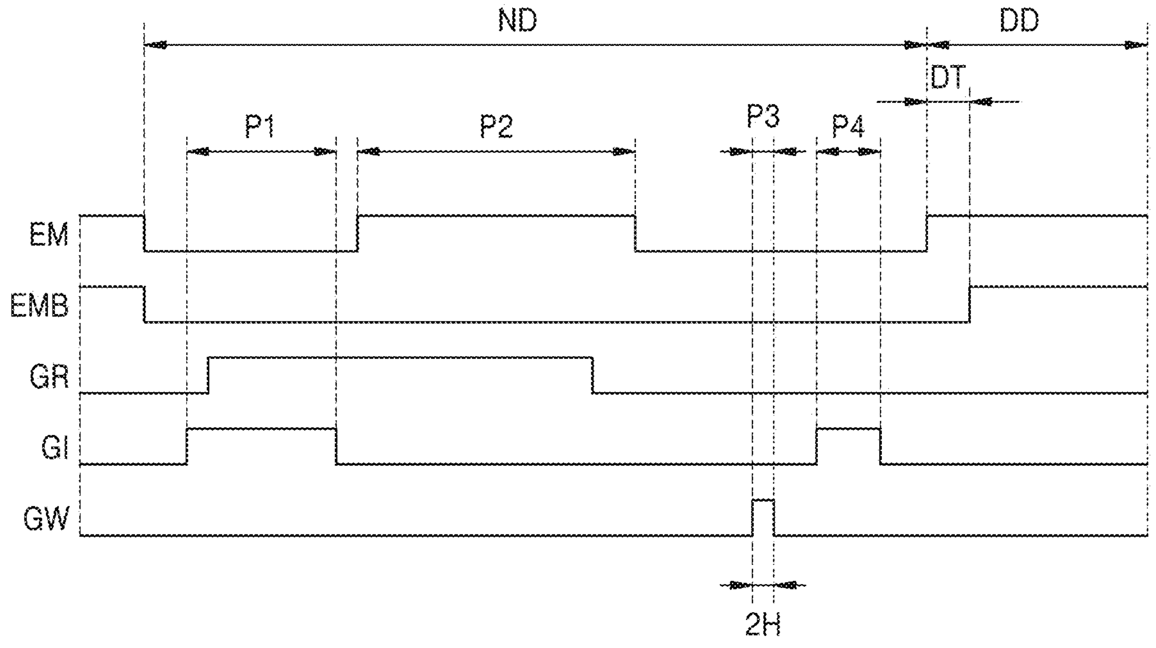
FIG. 10 is a waveform diagram of signals for explaining an operation of the sub-pixel shown in FIG. 9.

FIG. 9 is an equivalent circuit diagram of a sub-pixel PX according to an embodiment, and FIG. 10 is a waveform diagram of signals for explaining an operation of the sub-pixel PX shown in FIG. 9.

Referring to FIG. 9, the sub-pixel PX may include an organic light-emitting diode OLED and a sub-pixel circuit PC connected to the organic light-emitting diode OLED. The sub-pixel circuit PC may include the first to seventh transistors T1, T2, T3, T4, T5, T6, and T7, and the first and second capacitors C1 and C2. The first transistor T1 may be a driving transistor configured to output a driving current corresponding to a data signal Vdata, and the second to seventh transistors T2, T3, T4, T5, T6, and T7 may be switching transistors configured to transfer signals.

The first transistor T1 to the seventh transistor T7 may be implemented as thin-film transistors. A first terminal and a second terminal of each of the first transistor T1 to the seventh transistor T7 may be a source region or a drain region, and the second terminal may be a terminal different from the first terminal. As an example, in the case where the first terminal is a source region, the second terminal may be a drain region.

The sub-pixel PX may be connected to a first gate line GWL configured to transfer a first gate signal GW, a second gate line GIL configured to transfer a second gate signal GI, a third gate line GRL configured to transfer a third gate signal GR, a fourth gate line EML configured to transfer a fourth gate signal EM, a fifth gate line EMBL configured to transfer a fifth gate signal EMB, and a data line DL configured to transfer a data signal Vdata. Because emission of the sub-pixel PX is controlled by a fourth gate signal EM and a fifth gate signal EMB, a fourth gate signal EM and a fifth gate signal EMB may be referred to as emission control signals, and the fourth gate line EML and the fifth gate line EMBL may be referred to as emission control lines.

The sub-pixel PX may be connected to the driving voltage line PL configured to transfer the driving voltage ELVDD, a reference voltage line VRL configured to transfer a reference voltage Vref, a first initialization voltage line VL1 configured to transfer a first initialization voltage Vint, and a second initialization voltage line VL2 configured to transfer a second initialization voltage Vaint.

In an embodiment, as shown in FIG. 9, the first to seventh transistors T1, T2, T3, T4, T5, T6, and T7 may be provided as n-channel metal-oxide semiconductor field-effect transistors (MOSFETs). In an embodiment, some of the first to seventh transistors T1, T2, T3, T4, T5, T6, and T7 may be n-channel metal-oxide semiconductor (NMOS) field-effect transistors (n-channel MOSFETs), and the rest may be p-channel metal-oxide semiconductor (PMOS) field-effect transistors (p-channel MOSFETs). In an embodiment, the first to seventh transistors T1, T2, T3, T4, T5, T6, and T7 may be p-channel metal-oxide semiconductor (PMOS) field-effect transistors (p-channel MOSFETs).

In an embodiment, semiconductor layers of the first to seventh transistors T1, T2, T3, T4, T5, T6, and T7 may include an oxide semiconductor. The semiconductor layers of the first to seventh transistors T1, T2, T3, T4, T5, T6, and T7 may include an oxide of at least one of indium (In), gallium (Ga), stannum (Sn), zirconium (Zr), vanadium (V), hafnium (Hf), cadmium (Cd), germanium (Ge), chromium (Cr), titanium (Ti), aluminum (Al), cesium (Cs), cerium (Ce), and zinc (Zn). As an example, the semiconductor layers of the first to seventh transistors T1, T2, T3, T4, T5, T6, and T7 may be an InSnZnO (ITZO) semiconductor, an InGaZnO (IGZO) semiconductor, and the like within the spirit and the scope of the disclosure.

As another example, semiconductor layers of the first to seventh transistors T1, T2, T3, T4, T5, T6, and T7 may include a silicon semiconductor. As an example, the semiconductor layers of the first to seventh transistors T1, T2, T3, T4, T5, T6, and T7 may include low temperature polycrystalline silicon (LTPS).

As another example, some of the semiconductor layers among the first to sixth transistors T1, T2, T3, T4, T5, T6, and T7 may include low temperature polycrystalline silicon (LTPS), and the others may include oxide semiconductor (for example, IGZO and the like within the spirit and the scope of the disclosure).

Because an oxide semiconductor has high carrier mobility and a low leakage current, a voltage drop is not large even in case that a driving time is long. For example, in the oxide semiconductor, because a color change of an image according to a voltage drop is not large even while the display apparatus is driven in low frequencies, the display apparatus may be driven in low frequencies. Accordingly, in the case where the semiconductor layers of the first to seventh transistors T1, T2, T3, T4, T5, T6, and T7 include an oxide semiconductor, a display apparatus in which occurrence of a leakage current is prevented and, simultaneously with reduced power consumption may be implemented. In case of using an oxide semiconductor transistor, because a crystallization process by excimer laser annealing is not required to form an LTPS semiconductor transistor, manufacturing costs of a display panel may be remarkably reduced. Accordingly, a large-sized display apparatus may be advantageously implemented.

Because an oxide semiconductor is sensitive to light, change in the amount of current and the like may occur due to external light. Accordingly, it may be taken into account that a metal layer is positioned below an oxide semiconductor to absorb or reflect external light. In an embodiment, a metal layer may be positioned below at least one of the first to seventh transistors T1, T2, T3, T4, T5, T6, and T7, and the metal layer may serve as a lower gate electrode. As an example, the first transistor T1, which is the driving transistor, may be a double-gate transistor having two gate electrodes. The two gate electrodes may be disposed at different layers and may overlap each other.

The first transistor T1 may be connected between the driving voltage line PL and the second node N2. The first transistor T1 may include a first gate electrode connected to the first node N1, and a second gate electrode connected to the second node N2. The first gate electrode and the second gate electrode may be disposed to face each other with the semiconductor layer therebetween. The second gate electrode of the first transistor T1 may be connected to the second terminal of the first transistor T1 and controlled by a voltage applied to the second terminal of the first transistor T1, and output saturation characteristics of the first transistor T1 may be improved. The first terminal of the first transistor T1 may be connected to the driving voltage line PL through the fifth transistor T5. The second terminal of the first transistor T1 may be connected to a sub-pixel electrode of the organic light-emitting diode OLED through the sixth transistor T6. The first transistor T1 may receive a data signal Vdata according to a switching operation of the second transistor T2 and be configured to control the amount of driving current flowing through the organic light-emitting diode OLED.

The second transistor T2 (a data-write transistor) may be connected between the data line DL and the first gate electrode of the first transistor T1. The second transistor T2 may include a gate electrode, a first terminal, and a second terminal, wherein the gate electrode is connected to the first gate line GWL, the first terminal is connected to the data line DL, and the second terminal is connected to the first node N1. The second transistor T2 may be turned on according to a first gate signal GW transferred to the first gate line GWL to electrically connect the data line DL to the first node N1 and transfer a data signal Vdata to the first node N1, the data signal Vdata being transferred through the data line DL.

The third transistor T3 (a first initialization transistor) may be connected between the first gate electrode of the first transistor T1 and the reference voltage line VRL. The third transistor T3 may include a gate electrode, a first terminal, and a second terminal, wherein the gate electrode is connected to the third gate line GRL, the first terminal is connected to the first node N1, and the second terminal is connected to the reference voltage line VRL. The third transistor T3 may be turned on according to a third gate signal GR transferred to the third gate line GRL and be configured to transfer the reference voltage Vref to the first node N1, the reference voltage Vref being transferred through the reference voltage line VRL.

The fourth transistor T4 (a second initialization transistor) may be connected between the first transistor T1 and the first initialization voltage line VL1. The fourth transistor T4 may include a gate electrode, a first terminal, and a second terminal, wherein the gate electrode is connected to the second gate line GIL, the first terminal is connected to the second node N2, and the second terminal is connected to the first initialization voltage line VL1. The fourth transistor T4 may be turned on according to a second gate signal GI transferred to the second gate line GIL and be configured to transfer the first initialization voltage Vint to the second node N2, the first initialization voltage Vint being transferred through the first initialization voltage line VL1.

The fifth transistor T5 (a first emission control transistor) may be connected between the driving voltage line PL and the first transistor T1. The fifth transistor T5 may include a gate electrode, a first terminal, and a second terminal, wherein the gate electrode is connected to the fourth gate line EML, the first terminal is connected to the driving voltage line PL, and the second terminal is connected to the first terminal of the first transistor T1. The fifth transistor T5 may be turned on or turned off according to a fourth gate signal EM transferred to the fourth gate line EML.

The sixth transistor T6 (a second emission control transistor) may be connected between the first transistor T1 and the organic light-emitting diode OLED. The sixth transistor T6 may be connected between the second node N2 and the third node N3. The sixth transistor T6 may include a gate electrode, a first terminal, and a second terminal, wherein the gate electrode is connected to the fifth gate line EMBL, the first terminal is connected to the second node N2, and the second terminal is connected to the third node N3. The second terminal of the sixth transistor T6 may be connected to a first terminal of the seventh transistor T7 and the sub-pixel electrode of the organic light-emitting diode OLED. The sixth transistor T6 may be turned on or turned off according to a fifth gate signal EMB transferred to the fifth gate line EMBL.

Although it is shown in FIG. 9 that the fifth transistor T5 and the sixth transistor T6 are configured to respectively operate in response to a fourth gate signal EM and a fifth gate signal EMB different from each other, the fifth transistor T5 and the sixth transistor T6 may be configured to operate in response to the same gate control signal in an embodiment. In this case, the gate electrodes of the fifth transistor T5 and the sixth transistor T6 may be connected to the same gate line.

The seventh transistor T7 (a third initialization transistor) may be connected between the organic light-emitting diode OLED and the second initialization voltage line VIL2. The seventh transistor T7 may be connected between the sixth transistor T6 and the second initialization voltage line VL2. The seventh transistor T7 may include a gate electrode, a first terminal, and a second terminal, wherein the gate electrode is connected to the second gate line GIL, the first terminal is connected to the third node N3, and the second terminal is connected to the second initialization voltage line VL2. The seventh transistor T7 may be turned on according to a second gate signal GI transferred to the second gate line GIL and be configured to transfer the second initialization voltage Vaint to the third node N3, the second initialization voltage Vaint being transferred through the second initialization voltage line VL2.

Although it is shown in FIG. 9 that the fourth transistor T4 and the seventh transistor T7 are configured to operate in response to the same second gate signal GI, the fourth transistor T4 and the seventh transistor T7 may be configured to operate in response to different gate signals from each other in an embodiment. In this case, the fourth transistor T4 and the seventh transistor T7 may be connected to different gate lines from each other.

The first capacitor C1 may be connected between the first gate electrode of the first transistor T1 and the second terminal of the first transistor T1. A first electrode of the first capacitor C1 may be connected to the first node N1, and a second electrode of the first capacitor C1 may be connected to the second node N2. The first electrode of the first capacitor C1 may be connected to the first gate electrode of the first transistor T1, the second terminal of the second transistor T2, and the second terminal of the third transistor T3. The second electrode of the first capacitor C1 may be connected to the second terminal and the second gate electrode of the first transistor T1, the second electrode of the second capacitor C2, the first terminal of the fourth transistor T4, and the first terminal of the sixth transistor T6. The first capacitor C1 is a storage capacitor and may be configured to store a voltage corresponding to a threshold voltage Vth of the first transistor T1 and a data signal Vdata.

The second capacitor C2 may be connected between the driving voltage line PL and the second node N2. A first electrode of the second capacitor C2 may be connected to the driving voltage line PL. A second electrode of the second capacitor C2 may be connected to the second terminal and the second gate electrode of the first transistor T1, the second electrode of the first capacitor C1, the first terminal of the fourth transistor T4, and the first terminal of the sixth transistor T6. The second capacitor C2 may be a holding capacitor. For reference, the capacity of the first capacitor C1 may be greater than the capacity of the second capacitor C2.

The organic light-emitting diode OLED may be connected to the first transistor T1 through the sixth transistor T6. The organic light-emitting diode OLED may include the sub-pixel electrode (or an anode) and the opposite electrode (or a cathode), wherein the pixel electrode is connected to the third node N3, and the opposite electrode faces the sub-pixel electrode and is configured to receive the common voltage ELVSS. The opposite electrode may be a common electrode that is common over the sub-pixels PX.

Although it is shown in FIG. 9 that the sub-pixel circuit PC may include seven transistors and two capacitors, the sub-pixel circuit PC may include five transistors and two capacitors in an embodiment. In an embodiment, the sub-pixel circuit PC may include six transistors and two capacitors.

Referring to FIG. 10, the sub-pixel PX may be driven during at least one scan period of one frame. One scan period may include a non-emission period ND and an emission period DD. The non-emission period ND is a period in which the sub-pixel PX is configured not to emit light and may include a first period P1, a second period P2, a third period P3, and a fourth period P4.

Each of a first gate signal GW, a second gate signal GI, a third gate signal GR, a fourth gate signal EM, and a fifth gate signal EMB applied to the sub-pixel PX may have a high-level voltage for a portion of a period and have a low-level voltage for a portion of a period. Here, a high-level voltage may be an on-voltage configured to turn on a transistor, and a low-level voltage may be an off-voltage configured to turn off a transistor.

The first period P1 may be a first initialization period in which the first node N1 to which the first gate electrode of the first transistor T1 is connected, and the third node N3 to which the sub-pixel electrode of the organic light-emitting diode OLED is connected are initialized. During the first period P1, a second gate signal GI of an on-voltage may be supplied to the second gate line GIL. A third gate signal GR of an on-voltage may be supplied to the third gate line GRL. A first gate signal GW, a fourth gate signal EM, and a fifth gate signal EMB may be supplied as off-voltages. The on-voltage application timing of a third gate signal GR may be delayed by a preset time from the on-voltage application timing of a second gate signal GI.

The fourth transistor T4 and the seventh transistor T7 may be turned on according to a second gate signal GI, and the third transistor T3 may be turned on according to a third gate signal GR. The second node N2, for example, the second terminal of the first transistor T1 may be initialized to the first initialization voltage Vint by the turned-on fourth transistor T4. The first node N1, for example, the first gate electrode of the first transistor T1 may be initialized to the reference voltage Vref by the turned-on third transistor T3. The third node N3, for example, the sub-pixel electrode of the organic light-emitting diode OLED may be initialized to the second initialization voltage Vaint by the turned-on seventh transistor T7. The first capacitor C1 and the second capacitor C2 may be initialized by the turned-on third transistor T3 and fourth transistor T4.

The second period P2 may be a compensation period in which the threshold voltage of the first transistor T1 is compensated for. During the second period P2, a third gate signal GR of an on-voltage may be supplied to the third gate line GRL, and a fourth gate signal EM may be supplied to the fourth gate line EML. A first gate signal GW, a second gate signal GI, and a fifth gate signal EMB may be supplied as off-voltages.

The third transistor T3 may be turned on according to a third gate signal GR, and the fifth transistor T5 may be turned on according to a fourth gate signal EM. Accordingly, because the reference voltage Vref is supplied to the first node N1, and the driving voltage ELVDD is supplied to the first terminal of the first transistor T1, the first transistor T1 may be turned on. In case that the voltage of the second terminal of the first transistor T1 drops below a difference between the reference voltage Vref and the threshold voltage Vth of the first transistor T1, the first transistor T1 may be turned off. Because a voltage corresponding to the threshold voltage Vth of the first transistor T1 is stored in the first capacitor C1, the threshold voltage Vth of the first transistor T1 may be compensated for.

The third period P3 may be a data-write period in which a data signal Vdata is supplied to the sub-pixel PX. During the third period P3, a first gate signal GW of an on-voltage may be supplied to the first gate line GWL. In an embodiment, an on-voltage of a first gate signal GW may have a width of an about 2 horizontal period 2H. A second gate signal GI, a third gate signal GR, a fourth gate signal EM, and a fifth gate signal EMB may be supplied as off-voltages.

The second transistor T2 may be turned on according to a first gate signal GW, and the turned-on second transistor T2 may be configured to transfer a data signal Vdata from the data line DL to the first node N1, for example, the first gate electrode of the first transistor T1. Accordingly, the voltage of the first node N1 may be changed from the reference voltage Vref to a voltage corresponding to the data signal Vdata. In this case, the voltage of the second node N2 may be changed in response to the amount of voltage change of the first node N1. The voltage of the second node N2 may become a voltage changed according to the capacitance ratio of the first capacitor C1 and the second capacitor C2. Accordingly, the first capacitor C1 may be charged with a voltage corresponding to the threshold voltage Vth of the first transistor T1 and the data signal Vdata.

The fourth period P4 may be a second initialization period before the emission DD, in which the second node N2 to which the second terminal of the first transistor T1 is connected, and the third node N3 to which the sub-pixel electrode of the organic light-emitting diode OLED is connected are initialized. During the fourth period P4, a second gate signal GI of an on-voltage may be supplied through the second gate line GIL, and thus, the fourth transistor T4 and the seventh transistor T7 may be turned on. A first gate signal GW, a third gate signal GR, a fourth gate signal EM, and a fifth gate signal EMB may be supplied as off-voltages.

The fourth transistor T4 and the seventh transistor T7 are turned on according to a second gate signal GI, and the first initialization voltage Vint may be transferred to the second terminal of the first transistor T1 by the fourth transistor T4. The second initialization voltage Vaint may be transferred to the sub-pixel electrode of the organic light-emitting diode OLED by the turned-on seventh transistor T7.

In case that displaying low grayscales (for example, grayscale 11 to grayscale 31), brightness change may occur due to a voltage remaining in the organic light-emitting diode OLED. By initializing the third node N3 during the fourth period P4 after data writing and before emission of the sub-pixel, brightness change of the organic light-emitting diode OLED may be reduced in case that displaying low grayscale. Accordingly, image quality may be more improved. By using a voltage different from the first initialization voltage Vint, for example, a voltage higher than the first initialization voltage Vint as the second initialization voltage Vaint, a voltage change time of the sub-pixel electrode may be reduced. Accordingly, screen flickering may be reduced.

The emission period DD may be a period in which the sub-pixel PX, for example, the organic light-emitting diode OLED emits light. During the emission period DD, a fourth gate signal EM of an on-voltage may be supplied to the fourth gate line EML, and a fifth gate signal EMB may be supplied to the fifth gate line EMBL. A first gate signal GW, a second gate signal GI, and a third gate signal GR may be supplied as off-voltages.

During the emission period DD, the fifth transistor T5 may be turned on according to a fourth gate signal EM, and the sixth transistor T6 may be turned on according to a fifth gate signal EMB. In this case, the on-voltage application timing of a fifth gate signal EMB may be delayed by a preset time DT from the on-voltage application timing of a fourth gate signal EM. The driving voltage ELVDD may be supplied to the first terminal of the first transistor T1 by the turned-on fifth transistor T5. The first transistor T1 may be configured to emit light at a brightness corresponding to the magnitude of the driving current corresponding to the voltage corresponding to a data signal Vdata stored in the first capacitor C1.

This driving mode is provided as an example, and the display apparatus according to the disclosure may be configured to operate in another driving mode.

Figure 11:
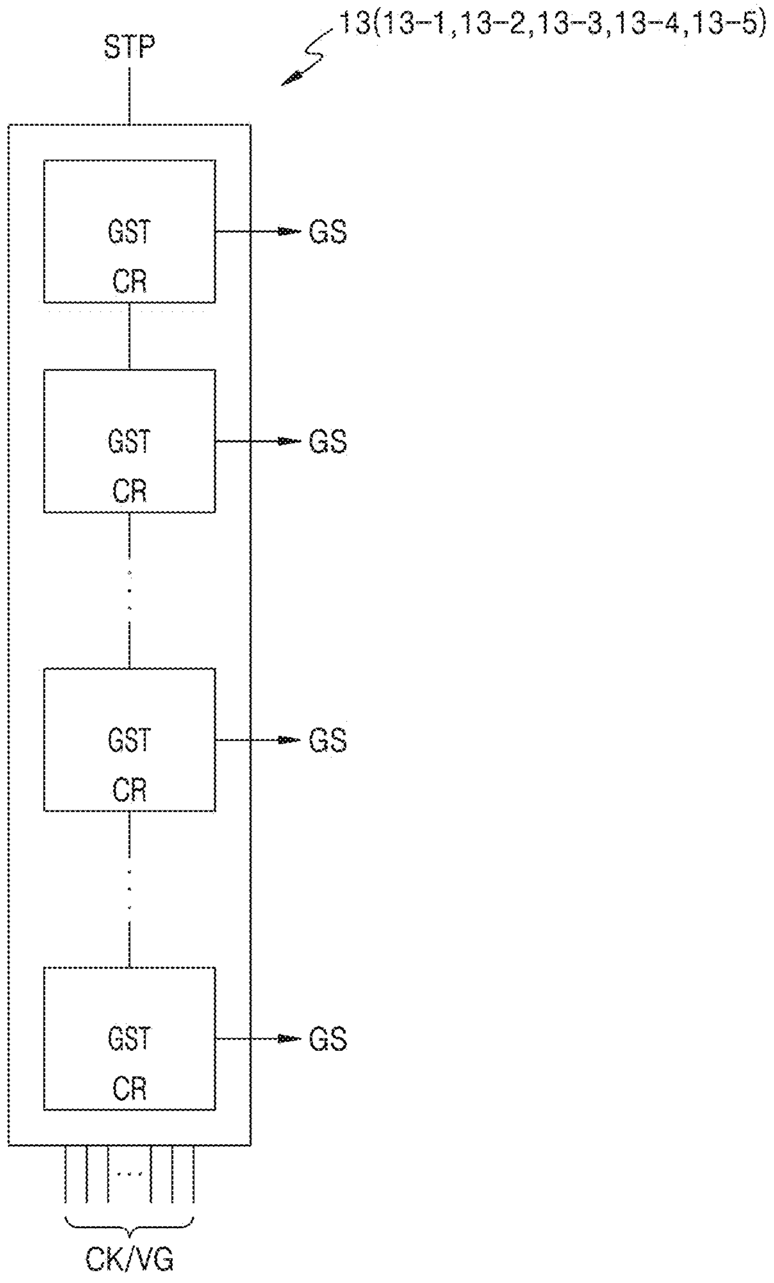
FIG. 11 is a schematic view of a gate driving circuit according to an embodiment.

FIG. 11 is a schematic view of a gate driving circuit 13 according to an embodiment.

Referring to FIG. 11, the gate driving circuit 13 may include gate driving circuits, for example, five gate driving circuits. The gate driving circuit 13 may include, for example, a first gate driving circuit 13-1, a second gate driving circuit 13-2, a third gate driving circuit 13-3, a fourth gate driving circuit 13-4, and a fifth gate driving circuit 13-5. However, the disclosure is not limited thereto and the gate driving circuit 13 may include three or four gate driving circuits. Some gate driving circuits may be integral. Each of the gate driving circuits may include stages GST arranged in the y direction (a column direction).

The stages GST may be connected to each other in the form of shift registers. As an example, gate signals GS may be generated by sequentially transferring a turn-on level pulse of a start signal STP supplied to a first stage GST to the next stage GST. A start signal line configured to supply a start signal STP may be connected to the first stage GST among the stages GST of the gate driving circuit 13. The stages GST may be configured to generate gate signals GS based on a start signal or an output signal (a gate signal GS generated by the previous stage) of the previous stage GST.

Each stage GST may be configured to receive at least one clock signal and at least one voltage signal VG and generate at least one gate signal GS. The stage GST may be configured to receive at least one clock signal CK from at least one clock signal line CKL and receive at least one voltage signal VG from at least one voltage line VL. Each stage GST may provide a carry signal CR to the preceding or subsequent stage. The preceding stage may be a stage before at least one stage, and the subsequent stage may be a stage after at least one stage.

Each stage GST may be configured to output at least one gate signal GS to at least one gate line connected thereto. As an example, each stage GST of the first gate driving circuit 13-1 may be configured to output a first gate signal GW to the first gate line GWL. Each stage GST of the second gate driving circuit 13-2 may be configured to output a second gate signal GI to the second gate line GIL. Each stage GST of the third gate driving circuit 13-3 may be configured to output a third gate signal GR to the third gate line GRL, and each stage GST of the fourth gate driving circuit 13-4 may be configured to output a fourth gate signal EM to the fourth gate line EML. Each stage GST of the fifth gate driving circuit 13-5 may be configured to output a fifth gate signal EMB to the fifth gate line EMBL.

Figure 12:
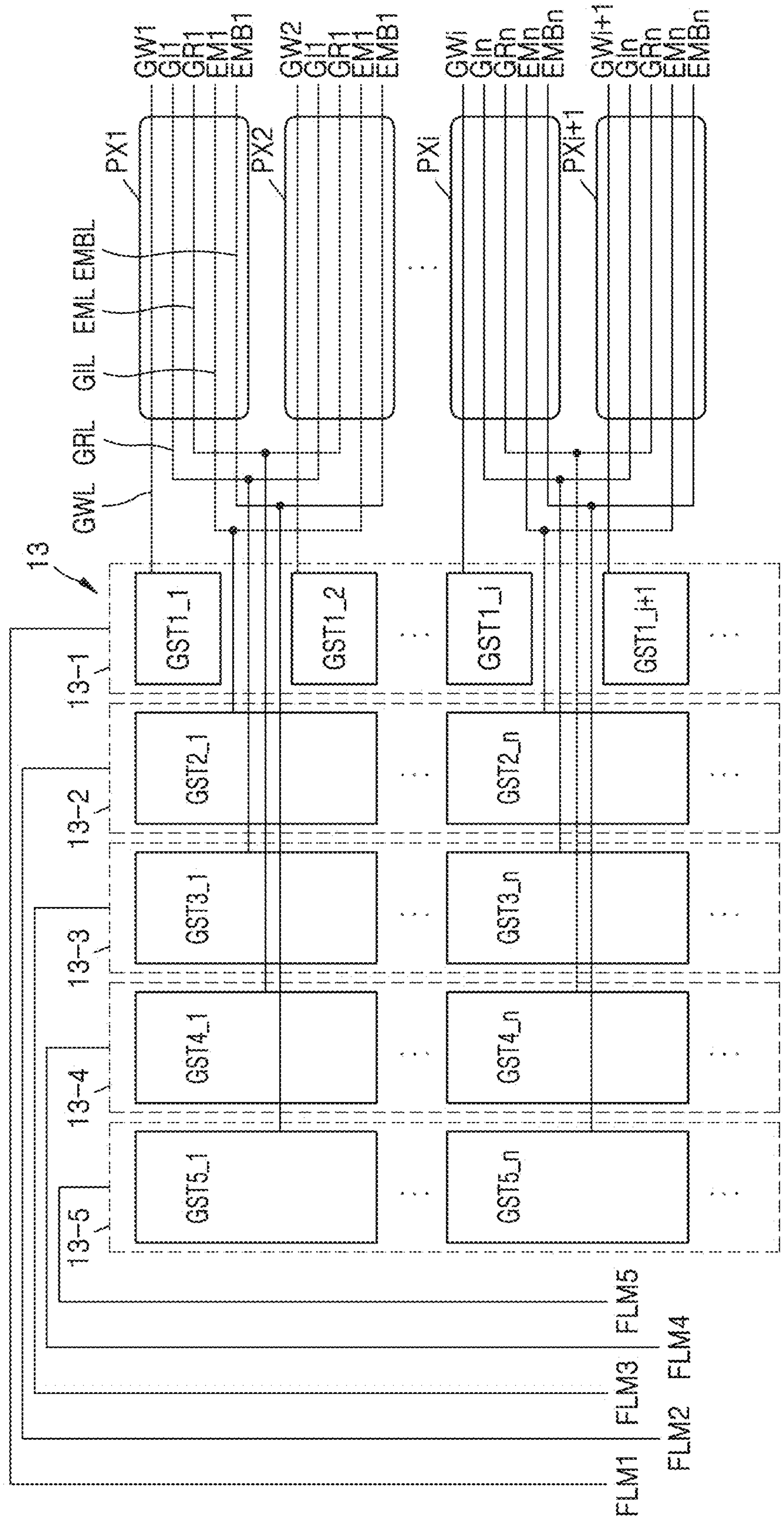
FIG. 12 is a view for explaining a gate driving circuit, start signal lines connected to the gate driving circuit, and gate lines connected to a sub-pixel according to an embodiment.

FIG. 12 is a view for explaining a gate driving circuit, start signal lines connected to the gate driving circuit, and gate lines connected to a sub-pixel according to an embodiment. Referring to FIG. 12, the gate driving circuit 13 may include, for example, the first gate driving circuit 13-1, the second gate driving circuit 13-2, the third gate driving circuit 13-3, the fourth gate driving circuit 13-4, and the fifth gate driving circuit 13-5. The first to fifth gate driving circuits 13-1, 13-2, 13-3, 13-4, and 13-5 may be arranged in the x direction (a row direction).

The thin-film transistor TFT included in the display apparatus according to an embodiment shown as an example in FIG. 7 may be included in the first to fifth gate driving circuits 13-1, 13-2, 13-3, 13-4, and 13-5.

In an embodiment, a different start signal line may be connected to a first stage of each gate driving circuit. In this case, the number of start signal lines may be provided corresponding to the number of gate driving circuits. However, the embodiment is not limited thereto. In an embodiment, one start signal line may be connected to first stages of the gate driving circuits. As an example, the display apparatus 1 may include a first start signal line FLM1 to a fifth start signal line FLM5 respectively corresponding to the first gate driving circuit 13-1 to the fifth gate driving circuit 13-5.

The first gate driving circuit 13-1 may include first stages GST1_1, GST1_2, . . . , GST1_*i*, GST1_*i*+1, . . . , and each of the first stages GST1_1, GST1_2, . . . , GST1_*i*, GST1_*i*+1, . . . , may correspond to each row of the pixel portion 11 (see FIG. 1).

The first first stage GST1_1 among the first stages GST1_1, GST1_2, . . . , GST1_*i*, GST1_*i*+1, . . . , of the first gate driving circuit 13-1 may be connected to the first start signal line FLM1. In case that a start signal is transferred to the first start signal line FLM1, the first stages GST1_1, GST1_2, . . . , GST1_*i*, GST1_*i*+1, . . . , may be configured to sequentially generate a first gate signal GW1, GW2, . . . , GWi, GWi+1 to output the same to the first gate line GWL in a corresponding row.

An i-th first stage GST1_*i* arranged to correspond to an i-th row of the first gate driving circuit 13-1 may be configured to supply an i-th first gate signal GWi to an i-th first gate line GWL connected to an i-th sub-pixel PXi arranged in an i-th row. An (i+1)-th first stage GST1_*i*+1 arranged to correspond to an (i+1)-th row of the first gate driving circuit 13-1 may be configured to supply an (i+1)-th first gate signal GWi+1 to an (i+1)-th first gate line GWL connected to an (i+1)-th sub-pixel PXi+1 arranged in an (i+1)-th row.

In this case, a first sub-pixel PX1, a second sub-pixel PX2, the i-th sub-pixel PXi, and the (i+1)-th sub-pixel PXi+1 are sub-pixels arranged in the same column and may have substantially the same sub-pixel structure. The second gate driving circuit 13-2 may include second stages GST2_1, . . . , GST2_*n*, . . . , and each of the second stages GST2_1, . . . , GST2_*n*, . . . , may correspond to two or more rows of the pixel portion 11. As an example, each of the second stages GST2_1, . . . , GST2_*n*, . . . , may correspond to two rows of the pixel portion 11.

The first second stage GST2_1 among the second stages GST2_1, . . . , GST2_*n*, . . . , of the second gate driving circuit 13-2 may be connected to the second start signal line FLM2. In case that a start signal is transferred to the second start signal line FLM2, the second stages GST2_1, . . . , GST2_*n*, . . . , may be configured to sequentially generate a second gate signal GI1, . . . , GIn to output the same to the second gate line GIL in a corresponding row. As an example, the second gate signal GI1, . . . , GIn may be simultaneously supplied to the second gate lines GIL arranged in two rows.

An n-the second stage GST2_*n* of the second gate driving circuit 13-2 may be configured to supply an n-th second gate signal GIn to an i-th second gate line GIL connected to an i-th sub-pixel PXi, and an (i+1)-th second gate line GIL connected to an (n+1)-th sub-pixel PXi_1.

The third gate driving circuit 13-3 may include third stages GST3_1, . . . , GST3_*n*, . . . , and each of the third stages GST3_1, . . . , GST3_*n*, . . . , may correspond to two or more rows of the pixel portion 11. As an example, each of the third stages GST3_1, . . . , GST3_*n*, . . . , may correspond to two rows of the pixel portion 11.

The first third stage GST3_1 among the third stages GST3_1, . . . , GST3_*n*, . . . , of the third gate driving circuit 13-3 may be connected to the third start signal line FLM3. In case that start signal is transferred to the third start signal line FLM3, the third stages GST3_1, . . . , GST3_*n*, . . . , may be configured to sequentially generate a third gate signal GR1, . . . , GRn to output the same to the third gate line GRL in a corresponding row. As an example, the third gate signal GR1, . . . , GRn may be simultaneously supplied to the third gate lines GRL arranged in two rows.

An n-th third stage GST3_*n* of the third gate driving circuit 13-3 may be configured to supply an n-th third gate signal GRn to an i-th third gate line GRL connected to an i-th sub-pixel PXi, and an (i+1)-th third gate line GRL connected to an (n+1)-th sub-pixel PXi_1.

The fourth gate driving circuit 13-4 may include fourth stages GST4_1, . . . , GST4_*n*, . . . , and each of the fourth stages GST4_1, . . . , GST4_*n*, . . . , may correspond to two or more rows of the pixel portion 11. As an example, each of the fourth stages GST4_1, . . . , GST4_*n*, . . . , may correspond to two rows of the pixel portion 11.

The first fourth stage GST4_1 among the fourth stages GST4_1, . . . , GST4_*n*, . . . , of the fourth gate driving circuit 13-4 may be connected to the fourth start signal line FLM4. In case that a start signal is transferred to the fourth start signal line FLM4, the fourth stages GST4_1, . . . , GST4_*n*, . . . , may be configured to sequentially generate a fourth gate signal EM1, . . . , EMn to output the same to the fourth gate line EML in a corresponding row. As an example, the fourth gate signal EM1, . . . , EMn may be simultaneously supplied to the fourth gate lines EML arranged in two rows.

An n-th fourth stage GST4_*n* of the fourth gate driving circuit 13-4 may be configured to supply an n-th fourth gate signal EMn to an i-th fourth gate line EML connected to an i-th sub-pixel PXi, and an (i+1)-th fourth gate line EML connected to an (n+1)-th sub-pixel PXi_1.

The fifth gate driving circuit 13-5 may include fifth stages GST5_1, . . . , GST5_*n*, . . . , and each of the fifth stages GST5_1, . . . , GST5_*n*, . . . , may correspond to two or more rows of the pixel portion 11. As an example, each of the fifth stages GST5_1, . . . , GST5_*n*, . . . , may correspond to two rows of the pixel portion 11.

The first fifth stage GST5_1 among the fifth stages GST5_1, . . . , GST5_*n*, . . . , of the fifth gate driving circuit 13-5 may be connected to the fifth start signal line FLM5. In case that a start signal is transferred to the fifth start signal line FLM5, the fifth stages GST5_1, . . . , GST5_*n*, . . . , may be configured to sequentially generate a fifth gate signal EMB1, . . . , EMBn to output the same to the fifth gate line EMBL in a corresponding row. As an example, the fifth gate signal EMB may be simultaneously supplied to the fifth gate lines EMBL arranged in two rows.

An n-th fifth stage GST5_*n* of the fifth gate driving circuit 13-5 may be configured to supply an n-th fifth gate signal EMBn to an i-th fifth gate line EMBL connected to an i-th sub-pixel PXi, and an (i+1)-th fifth gate line EMBL connected to an (n+1)-th sub-pixel PXi_1. The structure of the gate driving circuit is provided as an example, and the display apparatus according to the disclosure may include a gate driving circuit of a different structure.

According to an embodiment, a display apparatus with improved reliability and configured to display high-quality images may be implemented. However, the scope of the disclosure is not limited by this effect.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope and as defined by the following claims.

What is claimed is:

1. A display apparatus comprising:

a first bottom metal layer on a substrate;

a second bottom metal layer on the first bottom metal layer; and a thin-film transistor on the second bottom metal layer, the thin-film transistor including a semiconductor layer and a gate electrode, the semiconductor layer including a channel region, and the gate electrode overlapping the semiconductor layer, wherein the channel region includes a first region and a second region, the first region overlapping one of the first bottom metal layer and the second bottom metal layer in a plan view, and the second region overlapping the other of the first bottom metal layer and the second bottom metal layer in the plan view.

2. The display apparatus of claim 1, wherein the first bottom metal layer is electrically connected to the second bottom metal layer.

3. The display apparatus of claim 2, further comprising: a gate connection electrode, the gate connection electrode and the gate electrode on a same layer, wherein the gate connection electrode is electrically connected to the first bottom metal layer and the second bottom metal layer through a contact hole.

4. The display apparatus of claim 1, wherein the gate electrode, the first bottom metal layer, and the second bottom metal layer receive a same signal.

5. The display apparatus of claim 1, wherein the channel region includes a third region overlapping the first bottom metal layer and the second bottom metal layer.

6. The display apparatus of claim 1, further comprising: a scan driver included in a peripheral area, the scan driver including the thin-film transistor.

7. The display apparatus of claim 6, wherein the scan driver includes a plurality of stages and an output terminal corresponding to a scan line corresponding electrically to each of the plurality of stages.

8. The display apparatus of claim 1, further comprising: a pixel circuit included in a peripheral area, the pixel circuit including the thin-film transistor, and electrically connected to a display element.

9. The display apparatus of claim 1, wherein the gate electrode includes branches extending in a first direction and electrically connected, the first bottom metal layer includes first branch metals extending in the first direction and electrically connected, and the second bottom metal layer includes second branch metals extending in the first direction and electrically connected.

10. The display apparatus of claim 1, wherein a distance between the first bottom metal layer and the channel region is greater than a distance between the second bottom metal layer and the channel region in a cross-sectional view.

11. The display apparatus of claim 1, further comprising:

a first buffer layer between the first bottom metal layer and the second bottom metal layer; and a second buffer layer between the second bottom metal layer and the semiconductor layer, wherein each of the first buffer layer and the second buffer layer includes at least one of silicon oxide, silicon nitride, and silicon oxynitride.

12. A display apparatus comprising:

a pixel circuit included in a display area on a substrate and a display element electrically connected to the pixel circuit; and a scan driver included in a peripheral area on the substrate, wherein the scan driver includes:

a first bottom metal layer on the substrate;

a second bottom metal layer electrically connected to the first bottom metal layer; and a thin-film transistor on the second bottom metal layer, the thin-film transistor including a semiconductor layer and a gate electrode, wherein the semiconductor layer includes a channel region, and the gate electrode overlaps the semiconductor layer, and the channel region includes a first region and a second region, the first region overlapping one of the first bottom metal layer and the second bottom metal layer, in a plan view, and the second region overlapping the other of the first bottom metal layer and the second bottom metal layer in the plan view.

13. The display apparatus of claim 12, wherein the channel region includes a third region overlapping the first bottom metal layer and the second bottom metal layer in a plan view.

14. The display apparatus of claim 12, wherein the gate electrode is electrically connected to the first bottom metal layer and the second bottom metal layer.

15. The display apparatus of claim 12, wherein the gate electrode includes branch electrodes extending in a first direction and electrically connected, the first bottom metal layer includes first branch metals extending in the first direction and electrically connected, and the second bottom metal layer includes second branch metals extending in the first direction and electrically connected.

16. The display apparatus of claim 15, wherein the branch electrodes include a first branch electrode and a second branch electrode each extending in a second direction perpendicular to the first direction, the first branch metals include a first-1 branch metal overlapping at least a portion of the first branch electrode, and a first-2 branch metal overlapping at least a portion of the second branch electrode, and the second branch metals include a second-1 branch metal overlapping at least a portion of the first branch electrode, and a second-2 branch metal overlapping at least a portion of the second branch electrode.

17. The display apparatus of claim 16, wherein a width in the second direction between the first-1 branch metal and the second-2 branch metal is greater than a width in the second direction between the first-1 branch metal and the second branch electrode.

18. The display apparatus of claim 12, wherein a distance between the first bottom metal layer and the channel region is greater than a distance between the second bottom metal layer and the channel region in a cross-sectional view.

19. The display apparatus of claim 12, further comprising:

a first buffer layer between the first bottom metal layer and the second bottom metal layer; and a second buffer layer between the second bottom metal layer and the semiconductor layer, wherein each of the first buffer layer and the second buffer layer includes at least one of silicon oxide, silicon nitride, and silicon oxynitride.

20. The display apparatus of claim 12, further comprising:

a gate connection electrode integral with the gate electrode, wherein the gate connection electrode is electrically connected to the first bottom metal layer and the second bottom metal layer through a contact hole.

* * * * *